(12) United States Patent
Yelvington

(10) Patent No.: US 9,739,365 B2
(45) Date of Patent: Aug. 22, 2017

(54) METADRIVE PLANETARY GEAR DRIVE SYSTEM

(71) Applicant: Richard D. Yelvington, Largo, FL (US)

(72) Inventor: Richard D. Yelvington, Largo, FL (US)

( * ) Notice: Subject to any disclaimer, the term of this patent is extended or adjusted under 35 U.S.C. 154(b) by 159 days.

(21) Appl. No.: 14/513,964

(22) Filed: Oct. 14, 2014

(65) Prior Publication Data

US 2016/0102752 A1 Apr. 14, 2016

(51) Int. Cl.
| | |
|---|---|
| *F16H 57/08* | (2006.01) |
| *B63H 23/08* | (2006.01) |
| *F16H 3/60* | (2006.01) |
| *B62M 11/16* | (2006.01) |
| *B62K 11/04* | (2006.01) |
| *F16H 55/06* | (2006.01) |
| *F16H 63/30* | (2006.01) |
| *B62M 9/06* | (2006.01) |

(52) U.S. Cl.
CPC .............. *F16H 57/08* (2013.01); *B62K 11/04* (2013.01); *B62M 11/16* (2013.01); *B63H 23/08* (2013.01); *F16H 3/60* (2013.01); *B62M 9/06* (2013.01); *F16H 55/06* (2013.01); *F16H 63/302* (2013.01); *F16H 2057/085* (2013.01); *F16H 2200/0034* (2013.01); *F16H 2200/2005* (2013.01); *F16H 2200/2035* (2013.01); *F16H 2200/2079* (2013.01); *F16H 2200/2094* (2013.01)

(58) Field of Classification Search
None
See application file for complete search history.

(56) References Cited

U.S. PATENT DOCUMENTS

| | | | | |
|---|---|---|---|---|
| 7,311,636 | B1 * | 12/2007 | Regula | ..................... B62M 7/02 475/326 |
| 7,815,542 | B2 * | 10/2010 | Dec | ........................... F16H 3/60 192/69.91 |
| 2008/0287247 | A1 * | 11/2008 | Pusateri | ................... B25B 21/00 475/272 |
| 2013/0288846 | A1 * | 10/2013 | Schwarz | ................... B62M 7/02 475/210 |

* cited by examiner

*Primary Examiner* — Justin Holmes
(74) *Attorney, Agent, or Firm* — Laurence P. Colton; Smith Tempel Blaha LLC

(57) ABSTRACT

A planetary gear drive system in which the planetary gears are made of a resilient plastic or polymer compound so as to allow slippage within the system in response to over-torqueing, and a reverse drive incorporating the planetary gear drive system for use on motor vehicles.

17 Claims, 19 Drawing Sheets

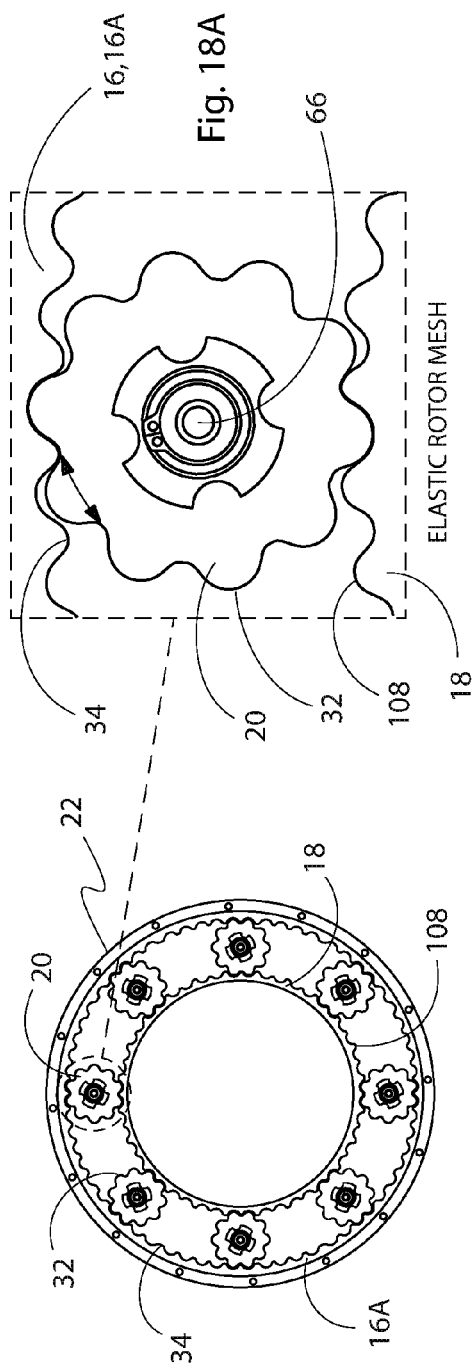
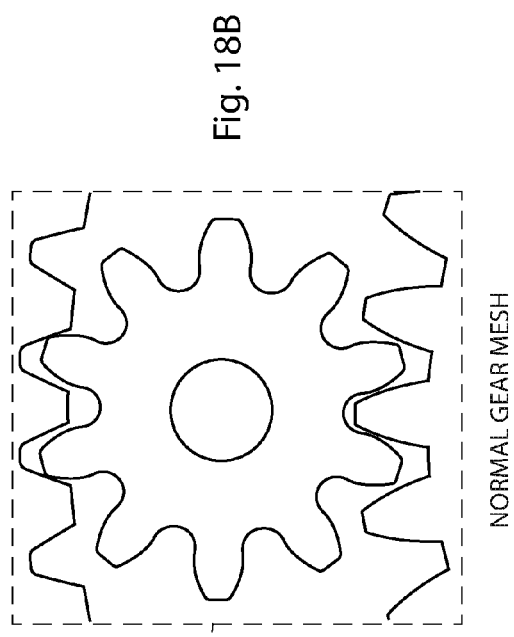
Fig. 18A
ELASTIC ROTOR MESH
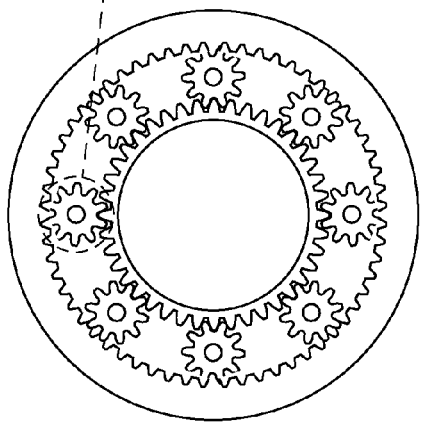
Fig. 18B
NORMAL GEAR MESH

META DRIVE AS A MARINE UNDER DRIVE

UNIT USES A CENTER DRIVE CASE THAT CAN BE ROTATED 180°
IN THIS CONFIGURATION, THE INNER DRUM IS TIED TO THE
CLUTCH OF THE BOAT MOTOR WITH AN EXTENSION AND
ADAPTER PLATE ON THE CLUTCH PLATE.

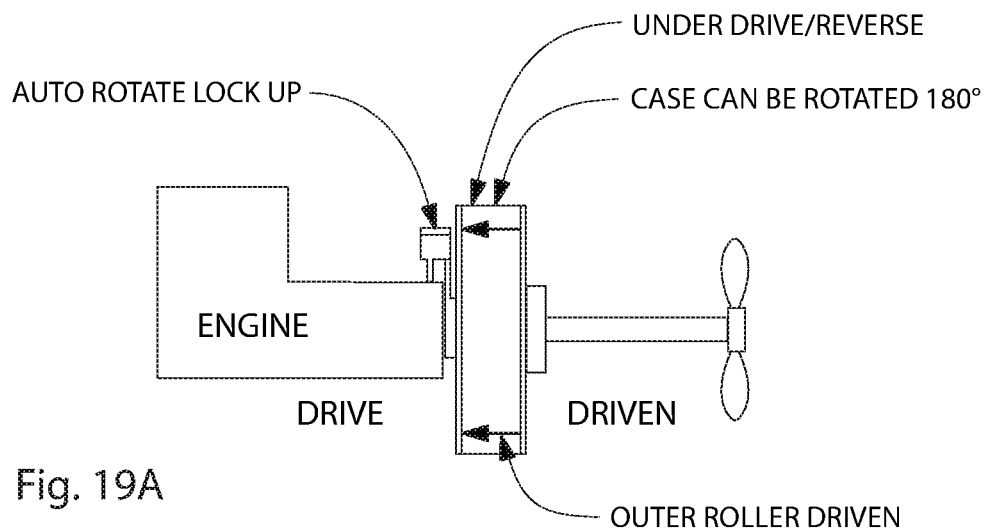

Fig. 19A

THE ENGINE DRIVE NOW RUNS THE PROPELLER THRU THE PROPELLER SHAFT (DRIVEN).
THE UNDER DRIVE/OVERDRIVE/REVERSE CAN BE WATER LUBRICATED
TO PREVENT WEAR AND ASSIST IN COOLING.

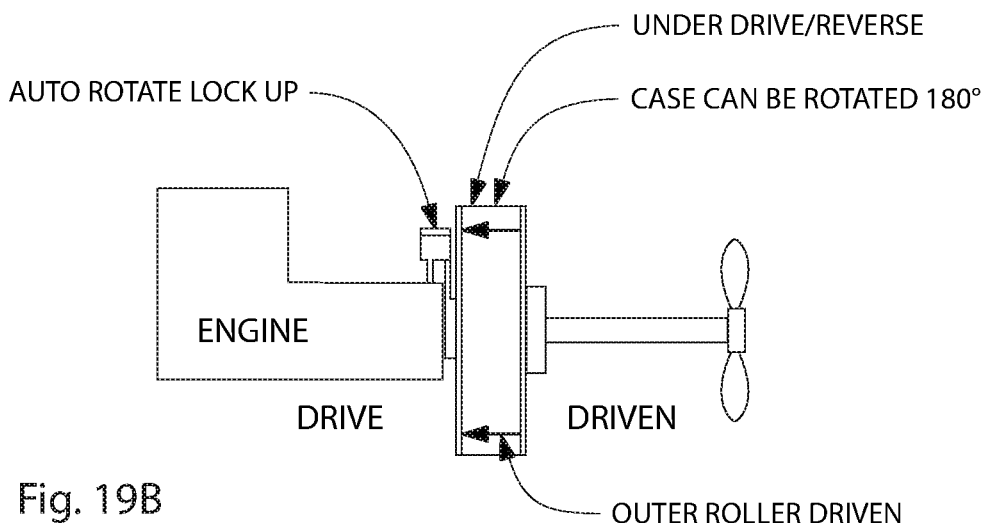

Fig. 19B

METADRIVE PLANETARY GEAR DRIVE SYSTEM

BACKGROUND OF THE INVENTION

Technical Field

The present invention relates generally to the field of mechanical transmission for power transfer applications, and more specifically to a planetary gear drive system for reversing rotation. The present invention also generally relates to robust and compact planetary gear drive systems comprising non-metal components, such as the planet gears, that allow slippage so as to reduce or eliminate damage to the planetary drive system or the motor driving the planetary drive system. The present invention further generally relates to lighter weight planetary gear drive systems that comprise non-metal bearings, that do not require lubricants, and that can be used as an underdrive, overdrive, speed reducer, or reverse drive for motor vehicles, such as motorcycles.

Prior Art

Current mechanical transmissions generally require a lubricant. In current mechanical transmissions, gears may be meshed to drive one or more teeth against a push surface on each gear. Generally, these gears rely on a close mesh created by pitch and angle to achieve motion. These gears often and generally preferably require grease or oil or a lubricant and close tolerances to prevent excessive wear and heat stress. These gears require sturdy heavy cases to contain the gear and shafting and also hold the gears at the correct spacing to avoid heat and damage. These efforts are bulky, heavy, and generally require lubricants that can harm the environment. For example, some current transmissions require a sump for oil to pool and be pitched up for splash or pressure lubricants. Other current transmissions require grease for the gears, but the grease will degrade or its chemistry will change from heat and evaporation over time. Still other current transmissions require an oil or lubricant pump to circulate the oil or lubricant about the transmission, which pump adds bulk and weight to the device. Thus, there is a need for a lubricant-free transmission, and for a relatively light-weight lubricant-free transmission.

Current planetary gear sets suitable for use on motor vehicles generally require metal components that are relatively heavy and that do not allow for flexure or slippage without damaging the transmission. For example, robust planetary gear sets require metal gears, including the ring gear, the sun gear, and the planet gears. Although planetary gear sets can be made from non-metal materials, such non-metal sets typically are not as robust as metal sets and typically cannot be used in motor vehicles or in other applications where a significant amount of power is to be transferred through or by the planetary gear set. Further, in all-metal planetary gear sets, there can be no slippage among the gears, as the metal components will not yield relative to each other. This can prevent the sets from operating in certain desired manners, and also can result in the binding or breaking of the gears if an opposite or angular force is placed on the gear set. Thus, there is a need for a planetary gear set for use on a motor vehicle, and for other applications, that can satisfactorily use non-metal components so as to allow slippage of the gears when necessary or desired to prevent damage to the planetary gear set and drive system.

Current mechanical transmissions for motor vehicles such as motorcycles typically do not include a reverse drive. Motorcycles, motor-tricycles, motor-scooters, and the like typically do not have reverse gears, instead relying on the rider to physically push the vehicle backwards. While some such motor vehicles do have a reverse drive, it often is a separate reverse motor, apart from the primary transmission, adding bulk and weight to the motor vehicle. As such motor vehicles increase in size or as riders of such motor vehicles increase in age, or both, or just for convenience, there is a need for a robust, light-weight reverse drive or gear set suitable for use on such motor vehicles.

Some representative current mechanical transmissions include U.S. Pat. No. 6,457,381, which describes using steel gears actuated to run off a starter motor which allows the motor to turn a drive shaft backwards and the wheels in reverse. The gears cannot act as an overdrive or under drive. European Patent Application No. EP 1088178 A2 describes a steel geared transmission lubricated by oil to achieve an overdrive effect by adding an additional gear. U.S. Pat. No. 4,189,960A describes an under drive transmission using steel gears and placed behind an existing transmission. This transmission only can be operated as an under drive and from one side as input and the other as output, and requires lubrication and precise gear pitch and settings.

Accordingly, there is a need for a device for the mechanical transmission of power that solves in whole or in part the deficiencies of existing devices for the mechanical transmission of power, such as described above, and for other power transmission and motion transmission devices. It is to these needs and others that the present invention is directed.

BRIEF SUMMARY OF THE INVENTION

Briefly, the present invention is directed towards a planetary gear set and drive train for use in transmitting power from a motor to a drive means. Although the present invention is suitable for use in connection with a number of drive systems incorporating typical motors, drive belts or chains, drive shafts, differentials, and axles, the present invention will be described herein in connection with a drive system for a motorcycle as an exemplary embodiment. Other suitable embodiments include, but are not limited to, motor scooters, motor tricycles, four-wheelers, boats and ships, power generators and turbines, hydraulic electricity generating equipment, tools such as power saws and drill presses, and other devices where a reduction, overdrive, underdrive, or reverse gear set based on a planetary gear set is desired or required.

In an exemplary embodiment, the present invention is a planetary gear system based, compact power transmission device placed between a power generator (for example, a motor) and a drive component (for example, a wheel and tire combination). Planetary gear systems are known and comprise an outer ring gear, an inner sun gear, and a plurality of planet gears between and operatively connecting the ring gear to the sun gear. The planet gears often are mounted on a carrier. The ring gear, sun gear, and planet gears (together referred to as the gears of the planetary gear system) of the present invention can be in a forward drive configuration or a reverse drive configuration. Although other configurations are possible, the forward and reverse drive configurations are the most common configurations and are of the most importance and interest in the present invention.

Exemplary embodiments of the invention are configured to be rotatably mounted on a static axle, such as the axle extending between the rear swing arms of a frame of a motorcycle. Such an axle typically is mounted is a static configuration between the swing arms, meaning that the axle is either bolted between the swing arms or is journaled between the swing arms in a non-drive manner in that the axle is not driven by the motor but merely acts as a support for the wheel and tire combination. In one exemplary configuration, the axle is non-rotatably attached to the swing arms and the wheel and tire combination rotates about the axle. In another exemplary combination, the axle is non-rotatably attached to the wheel and journaled into the swing arms such that the wheel and axle together rotate relative to the swing arms.

The planetary gear system further comprises a casing or housing. The casing, and thus the planetary gear system and all other internal components, are sized and structured to fit between the rear wheel and tire combination and the swing arms of a convention al motorcycle frame without any alteration to the basic structure of the frame and swing arms of the motorcycle. Thus, the present invention is sized and structured to be retrofitted to a motorcycle or used as original equipment for a motorcycle without altering the existing motorcycle frame configuration. In effect, the present invention is sized and structured to fit on a motorcycle as a replacement for the rear drive sprocket of the motorcycle.

The casing comprises a first circular or annular casing disc and a second circular or annular casing disc between which the ring gear is coaxially sandwiched and secured. The first casing disc can comprise a locking base for interacting with a locking means for locking the sun gear relative to the ring gear. The locking base can comprise holes, ridges or stops, or an inner locking claw for interacting with the locking means. The use of a claw-type device can allow for a smoother and/or more accurate connection for the locking means when locking the sun gear relative to the ring gear. For example, the claw-type device can have ramps leading to holes whereby pins or shafts on the locking means can contact and slide along the ramps and be directed into the holes for locking.

The present invention is rigidly secured to the rear wheel (or other drive component) via the sun gear and rotatably mounted on an axle that is rotatably or preferably non-rotatably secured between the swing arms. In this manner, the wheel along with the present invention can rotate about the axle in either direction of rotation. The device further is operatively connected to a motor (or other power generator) whereby when the motor operates, the operative connection (such as a belt or chain) between the motor and the present invention causes the present invention, and thus the wheel and tire combination, to rotate about the axle. When the invention is in the forward drive configuration, the driven wheel and tire configuration will rotate in one direction (for example, forward) and when the invention is in the reverse drive configuration, the driven wheel and tire combination will rotate in the opposite direction (for example, reverse or backward).

The outer surface (outer circumference) of the ring gear comprises teeth or gearing that cooperates with a conventional drive belt or chain. For example, on a motorcycle using a drive belt connecting the motor to the rear wheel, the outer surface of the ring gear comprises bumps or ridges that cooperate with the drive belt, whereby when the motor turns, thus driving the drive belt, the drive belt cooperates with the bumps or ridges, thus rotating the present invention. Similarly, on a motorcycle using a drive chain connecting the motor to the rear wheel, the outer surface of the ring gear comprises teeth that cooperate with the drive chain, whereby when the motor turns, thus driving the drive chain, the drive chain cooperates with the teeth, thus rotating the present invention. As the exemplary motor only causes rotation in one direction due to the typical motorcycle transmission only comprising forward and no reverse gears, the drive belt or chain only is driven in one direction, thus the ring gear of the present invention only rotates in one direction. The locking and unlocking of the gears of the planetary gear system into the forward drive configuration or the reverse drive configuration cause the rear wheel to rotate forwards or backwards, respectively, about the axle, imparting forwards or backwards (reverse) motion to the motorcycle.

At least one locking means is provided for locking and unlocking the gears of the planetary gear system. An exemplary locking means can comprise an actuator, such as a solenoid, a motor, or a mechanical connection activation means. For example, a solenoid or motor can be activated to move a locking means from a locked position to an unlocked position, and vice versa, in a linear manner. For another example, a mechanical connection can be activated to rotate a screw gear, worm gear, or squirm gear thereby causing a locking means to be moved from a locked position to an unlocked position, and vice versa, also in a linear manner. An exemplary locking means can include pins, shafts, rods, bars, or the like that extend through holes in the sun gear into the locking base of the first housing disc of the housing, thereby locking the sun gear relative to the ring gear. Another locking means can include interacting opposing ridges and ramps, wherein contact between opposing ridge faces on a first component and a second component, respectively, can prevent movement or rotation of the first component relative to the second component.

The ring gear and the sun gear preferably are made of metal or another material sufficiently strong and durable so as to handle the power output of the motor and to transfer the power output of the motor to the rear wheel. The planet gears can be made of metal or the same material as the ring and/or sun gear, but preferably are made of a resilient polymer composition, such as a urethane or rubber, so as to allow mechanical slippage or shape distortion upon over-torqueing of the planetary gear system. For example, if all of the gears of the planetary gear system were made of metal or another rigid material, over-torqueing of the system could result in a failure of the system by breakage or jamming. Similarly, as the system is not a closed (sealed) system, foreign objects such as dirt or rocks may be able to enter the system and lodge between the gears of the planetary gear system. By using a resilient polymer composition, such as a urethane or rubber, for the planet gears, the planet gears are less likely to bind or jam upon over-torqueing or encountering a foreign object, and will slip, yield, or distort allowing the system to continue to operate. As there are a plurality of planet gears, and as the planet gears are smaller relative to the ring gear and the sun gear, the use of a resilient polymer composition, such as a urethane or rubber, for the planet gears does not degrade the strength of the system, at least not to an extent that would cause premature failure of the system.

Rather than using oil-based, natural, or synthetic lubricants, such as liquids, gels, or greases, the present invention can use ball bearings and/or rod bearings between the rotating parts of the invention. For example, synthetic polymers such as acetyl resins possess sufficient tensile strength, creep resistance, and toughness to serve as bearings. The DELRIN® brand of polymethylene is a suitable acetyl resin. This acetyl resin can be formed into balls and rods for placement in holes and slots provided in the various moving parts of the invention for imparting bearing surfaces between the rotating parts.

In use, the exemplary embodiment of the present invention replaces the rear drive sprocket of a motorcycle so as to retrofit or originally fit a motorcycle with a reverse drive. The motorcycle engine (or other motor) drives a drive belt or chain in a conventional manner, namely, only in a single direction with the top run of the belt or chain moving in a direction from the back of the motorcycle to the front of the motor cycle and the bottom run of the belt of chain moving in a direction from the front of the motorcycle to the back of the motorcycle, so as to drive the ring gear and housing of the present invention in single rotational manner. In the forward drive configuration, wherein the ring gear and the sun gear of the planetary gear system are locked relative to each other, the rear wheel and tire combination of the motorcycle is driven in a direction causing the forward motion of the motorcycle. In the reverse drive configuration, wherein the ring gear and the sun gear of the planetary gear system are unlocked relative to each other and the planet gear carrier (carrying the planet gears) is locked in a non-rotating position relative to the swing arms, whereby the planetary gear system operates in a conventional manner causing the sun gear to rotate in an opposite rotational direction from the ring gear, the rear wheel and tire combination of the motorcycle is driven in a direction causing the rearward motion of the motorcycle.

In alternative uses, the present invention can function as a lubricant-free, jam- or binding-resistant underdrive, overdrive, speed reducer, or reverse drive for power transfer systems.

Thus, the present invention is directed toward a lubricant-free planetary gear system and drive comprising an output sun gear mounted on a rotatable axle and attached to a wheel (or other drive component), the axle being mounted on a body, a planet gear carrier carrying a plurality of planet gears that engage the sun gear, a ring gear that engages the plurality of planet gears, wherein the sun gear is reversibly lockable relative to the ring gear, and wherein each planet gear can be made of resilient plastics composition that allows the planet gear slippage when over-torqueing the input ring rotor while the planet gear carrier is locked relative to the motorcycle frame.

These features, and other features and advantages of the present invention will become more apparent to those of ordinary skill in the relevant art when the following detailed description of the preferred embodiments is read in conjunction with the appended drawings in which like reference numerals represent like components throughout the several views.

BRIEF DESCRIPTION OF THE DRAWINGS

In the figures, like reference numerals refer to like parts throughout the various views unless otherwise indicated. For reference numerals with letter character designations such as 102A or 102B, the letter character designations may differentiate two like parts or elements present in the same figure. Letter character designations for reference numerals may be omitted when it is intended that a reference numeral to encompass all parts comprising the same reference numeral in all figures.

FIG. 18 shows a comparison of a planet gear of the present invention (FIG. 18A) and a prior art planet gear (FIG. 18B).

FIG. 19 shows schematic views of a planetary gear drive system of the present invention configured in line with a boat engine as an under drive, or reduction gearing system in the forward engaged position (FIG. 19A) and the reverse engaged position (FIG. 19B).

DETAILED DESCRIPTION OF PREFERRED EMBODIMENTS

Aspects, features and advantages of exemplary embodiments of the present invention will become better understood with regard to the following description of preferred embodiments when read in connection with the accompanying drawings. It should be apparent to those of ordinary skill in the art that the disclosed embodiments of the present invention provided herein are illustrative only and are not limiting, comprising been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. The word exemplary is used herein to mean serving as an example, instance, or illustration. Any aspect described herein as exemplary is not to be construed as exclusive, preferred or advantageous over other aspects.

Planetary Gear System Configuration

Figure 1:
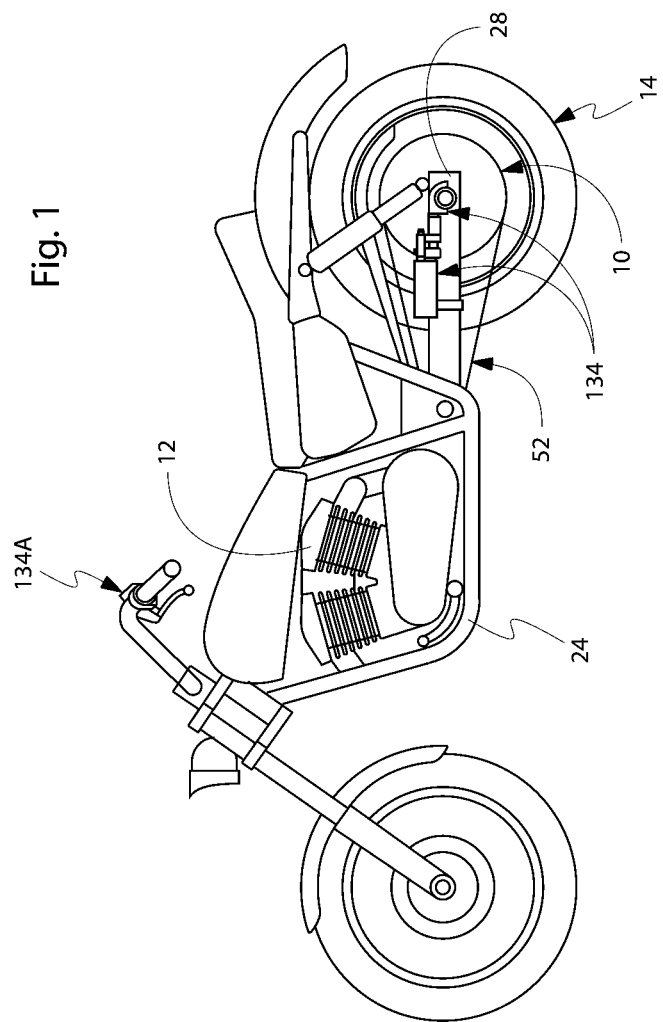
FIG. 1 shows a schematic of a standard motorcycle equipped with the present invention.

In the present description and claims, the planetary gear drive system 10 of the present invention is referred to as a metadrive. In an exemplary embodiment, used to disclose and enable the present invention, shown on a motorcycle in FIG. 1, the planetary gear drive system 10 of the present invention is a compact device placed between a power generator (for example, a motor 12) and a drive component (for example, a wheel and tire combination 14). Planetary gear systems are known and comprise an outer ring gear 16, an inner sun gear 18, and a plurality of planet gears 20 between and operatively connecting the ring gear 16 to the sun gear 18. In one configuration, termed the forward drive configuration, the ring gear 16 and the sun gear 18 of the planetary gear system are locked relative to each other whereby rotating the ring gear 16 in a first direction (for example, clockwise) causes the sun gear 18 also to rotate in the first direction. In another configuration, termed the reverse drive configuration, the ring gear 16 and the sun gear 18 of the planetary gear system are not locked relative to each other, while the planet gear carrier 22 is locked relative to the motorcycle frame 24, whereby rotating the ring gear 16 in a first direction (for example, clockwise) causes the sun gear 18 to rotate in a second, opposite direction from the ring gear 16 (for example, counter- or anti-clockwise). As planetary gear systems in general are known in the art, they will not be further generally described herein.

Figure 2:
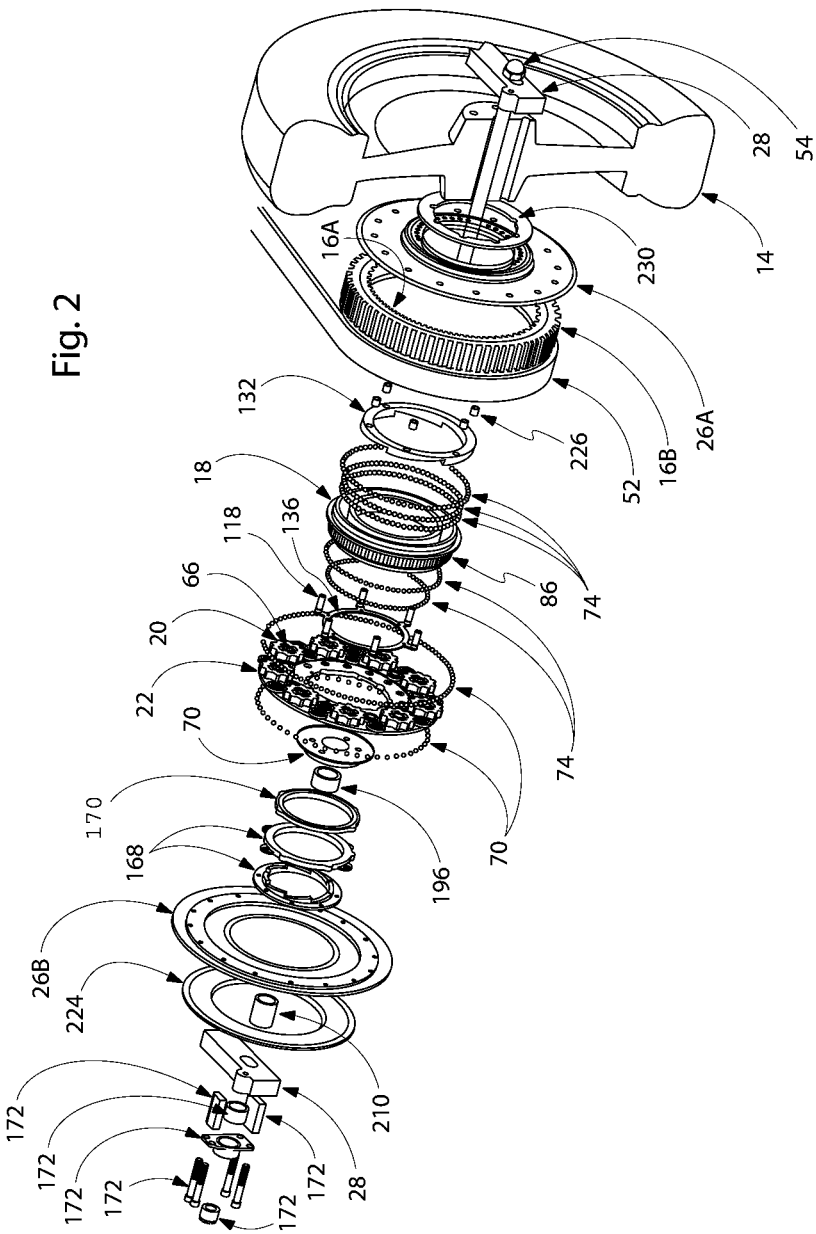
FIG. 2 shows a first exploded view of the planetary gear drive system for use with a motorcycle drive belt.
Figure 3:
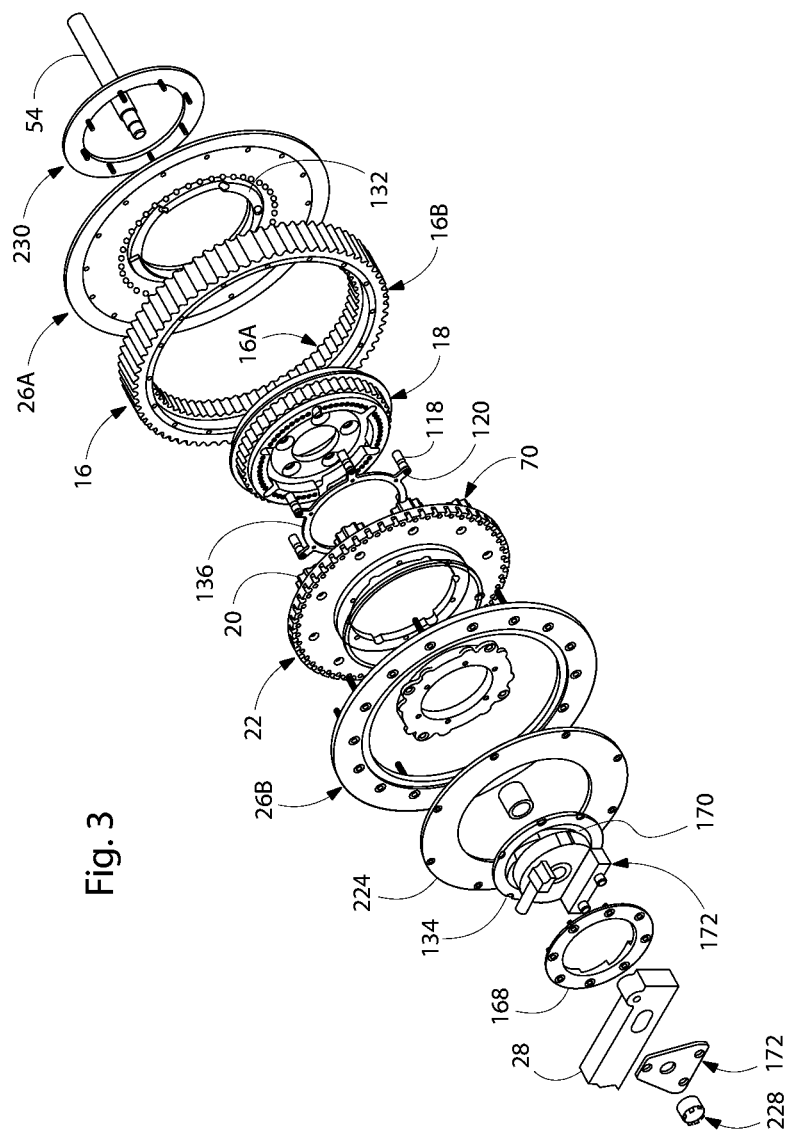
FIG. 3 shows a second exploded view of the planetary gear drive system for use with a motorcycle drive belt.
Figure 4:
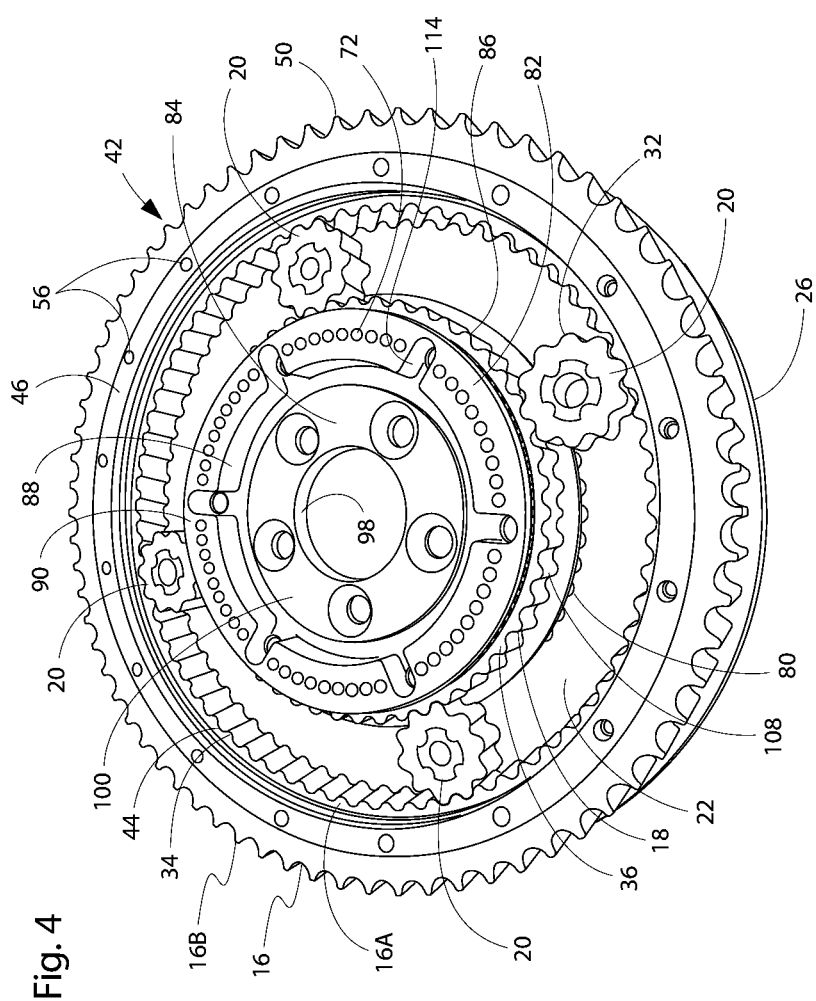
FIG. 4 shows a side view of the configuration of a representative planetary gear drive suitable for use with the present invention.

Referring to the appended figures, the present invention 10 (herein, the terminology the present invention includes all embodiments of the present invention, including alternatives and equivalents) comprises a planetary gear system enclosed, encased, sandwiched in, and/or supported by a thin walled metal or composite outer casing 26, for example, an aluminum, carbon fiber, glass fiber, or ceramic composite casing, which preferably allows for a high horsepower transfer per unit weight compared to planetary gear systems comprising only metal, or steel, shafting and gears. The entire device 10, including the outer casing 26, when used as a reverse gear for motorcycles, is sized and structured to fit between the rear wheel 14 of the motorcycle (the powered wheel) and the rear swing arms 28 of the motorcycle frame 24. For example, a preferred structure of the present invention 10 utilizes the ring gear 16 as the circumferential wall of the outer casing 26 sandwiched between a first circular or annular casing disc 26A and a second circular or annular casing disc 26B, thus forming a generally cylindrical structure with the ring gear 16 being the cylindrical wall and the casing discs 26A, 26B being the sides on either end of the cylindrical wall. Each of the casing discs 26A, 26B comprises an opening therethrough, preferably an axial opening. FIGS. 2-4 show exploded views of representative configurations of the metadrive. 10.

The planet gears 20 are mounted on a planet gear carrier 22 in a typical manner, namely, rotatably mounted such that each planet gear 20 can rotate independently, that is, the planet gears 20 do not interact with each other and thereby all rotate in the same direction when forced to rotate in the reverse drive configuration by the turning of the ring gear 16 or, alternatively, by the turning of the sun gear 18. The planet gears 20, rotatably attached to the planet gear carrier 22, are located within in the ring gear 16 whereby the external teeth 32 of the planet gears 20 interact with the internal teeth 34 of the ring gear 16 in a conventional manner. The sun gear 18 is located with the planet gears 20 whereby the external teeth 36 of the sun gear 18 interact with the external teeth 32 of the planet gears 20 in a conventional manner. The sun gear 18 is securely (rigidly) attached to the wheel 14 to be driven, for example, the rear wheel of the motorcycle.

The ring gear 16, sun gear 18, and planet gears 20 (together referred to as the gears of the planetary gear system) can be in a forward drive configuration or a reverse drive configuration. Although other configurations are possible, the forward and reverse drive configurations are the most common configurations and are of the most importance and interest in the present invention 10.

In the forward drive configuration, which is used to propel the motorcycle in the forward direction, the sun gear 18 is locked relative to the ring gear 16 and thus rotates axially along with the ring gear 16. As disclosed in more detail herein, a first locking means 38 locks the sun gear 18 to or relative to the outer casing 26, and thereby relative to the ring gear 16. In this configuration, as the ring gear 16 is securely (rigidly) attached to the outer casing 26 and as the sun gear 18 is locked to or relative to the outer casing 26, when the ring gear 16 is rotated, the sun gear 18 rotates in the same direction as the ring gear 16. As the sun gear 18 is securely (rigidly) attached to the drive wheel 14, the power from the motor 12 is transferred to the drive wheel 14, thus propelling the motorcycle forward. In this configuration, the planet gears 20 and planet gear carrier 22 may or may not be locked relative to the ring gear 16 and/or the sun gear 18, but are generally carried along in the same rotational direction as the ring gear 16 and the sun gear 18. As the sun gear 18 is locked relative to the ring gear 16, the movement of the planet gears 20 is irrelevant as in this forward drive configuration, the planet gears 20 do not act on either the ring gear 16 or the sun gear 18.

In the reverse drive configuration, the sun gear 18 is not locked relative to the ring gear 16. That is, the sun gear 18 is no longer locked to or relative to the outer casing 26. However, in the reverse drive configuration, the planet gear carrier 22 is locked relative to the frame 24 swing arm 28 whereby the planet gear carrier 22 does not rotate relative to the frame 24 swing arm 28. As disclosed in more detail herein, a second locking means 40 locks the planet gear carrier 22 to or relative to the motorcycle frame 24 swing arm 28. In this configuration, as the planet gear carrier 22 is locked to or relative to the swing arm 28, when the ring gear 16 is rotated, the planet gears 20 are caused to rotate in the same rotational direction as the ring gear 16, thus causing the sun gear 18 to rotate in the opposite direction as the ring gear 16. As the sun gear 18 is securely (rigidly) attached to the drive wheel 14, and as the sun gear 18 is now rotating in the opposite direction as the ring gear 16, the power from the motor 12 is transferred to the drive wheel 14 in an opposite direction from the forward drive configuration, thus propelling the motorcycle backwards.

The ring gear 16 is a cylindrical structure comprising an outer surface 42 on an outer circumference, an inner surface 44 on an inner circumference, an outer diameter, an inner diameter, a wall thickness 46 that is generally the difference between the outer and inner diameters, and a height 48 measured normal to the diameter. The outer surface 42 (outer circumference) of the ring gear 16 comprises teeth, bumps, or ridges 50 that cooperate with a conventional drive belt or chain 52. For example, on a motorcycle using a drive belt 52 connecting the motor 12 to the rear wheel 14, the outer surface 42 of the ring gear 16 comprises teeth, bumps, or ridges 50 that cooperate with the drive belt 52, whereby when the motor 12 turns, thus driving the drive belt 52, the drive belt 52 cooperates with the teeth, bumps, or ridges 50, thus rotating the present invention 10. Similarly, on a motorcycle using a drive chain 52 connecting the motor 12 to the rear wheel 14, the outer surface 42 of the ring gear 16 comprises teeth, bumps, or ridges 50 that cooperate with the drive chain 52, whereby when the motor 12 turns, thus driving the drive chain 52, the drive chain 52 cooperates with the teeth, bumps, or ridges 50, thus rotating the present invention 10. As the exemplary motor 12 only rotates in one direction, and as a motorcycle transmission only comprises forward and no reverse gears, the drive belt or chain 52 only is driven in one direction, thus the ring gear 16 of the present invention 10 is only rotated in one direction. As disclosed herein, the locking and unlocking of the gears of the planetary gear system cause the rear wheel 14 to rotate forwards or backwards, respectively, about the axle 54, imparting forwards or backwards (reverse) motion to the motorcycle.

The outer diameter of the ring gear 16 generally is selected to be approximately the same as the outer diameter of a conventional rear wheel drive sprocket for a motorcycle, whereby a conventional motorcycle drive belt or chain 52 can be used. However, the outer diameter of the ring gear 16 also can be larger or smaller than the outer diameter of a conventional rear wheel drive sprocket for a motorcycle if the planetary gear system and other components of the present invention 10 cannot suitably fit within such a conventional diameter, in which a larger outer diameter for the ring gear 16 is required, or can suitably fit within such a smaller diameter. As conventional motorcycle drive belts or chains 52 come in a variety of sizes, using a larger outer diameter for the ring gear 16 is a matter of design choice.

The inner surface 44 (inner circumference) of the ring gear 16 comprises teeth, bumps, or ridges 34 that cooperate with the teeth, bumps, or ridges 32 on the planet gears 20. For example, when the planet gears 20 rotatably attached to the planet gear carrier 22 are inserted into the interior of the ring gear 16, the teeth, bumps, or ridges 32 on the planet gears 20 fit within and cooperate with the teeth, bumps, or ridges 34 on the inner surface 44 (inner circumference) of the ring gear 16 whereby a rotation of the ring gear 16 in a first rotational direction can cause the rotation of the planet gears 20 also in the first rotational direction by the interaction of the respective teeth, bumps, or ridges 34 of the inner surface 44 (inner circumference) of the ring gear 16 and the teeth, bumps, or ridges 32 on the planet gears 20, particularly when the planet gear carrier 22 is held or locked is a stationary position.

The wall thickness 46 of the ring gear 16 is generally the difference between the outer and inner diameters, and can be selected based on the strength of the material of construction of the ring gear 16, the power output of the motor 12, the weight of the motorcycle or other component being driven by the motor 12, other known engineering factors, or combinations of these parameters. The height 48 of the ring gear 16 is measured normal to the diameter and generally is selected based on the size, height, and/or thickness of the drive belt or chain 52, whereby the drive belt or chain 52 can effectively operatively cooperate with the outer surface 42 of the ring gear 16 to drive the ring gear 16. For example, the height 48 of the ring gear 16 should be generally the same as, or slightly greater than, the cooperating thickness of the drive belt or chain 52. The ring gear 16 also can be two piece, an inner ring 16A and an outer ring 16B, with the outer ring 16B comprising the outer surface 42 (outer circumference) comprising teeth, bumps, or ridges 50 that cooperate with a conventional drive belt or chain 52 and the inner ring 16A comprising the inner surface 44 (inner circumference) comprising teeth, bumps, or ridges 34 that cooperate with the teeth, bumps, or ridges 32 on the planet gears 20. The inner ring 16A and the outer ring 16B can be rigidly attached to each other (the inner ring 16A being located inside of the outer ring 16B), or the inner ring 16A and the outer ring 16B can both be rigidly attached to the outer casing 26 (preferably the first casing disc 26A), or the outer ring 16B or the inner ring 16A or both can be manufactured as part of the outer casing 26 (preferably the first casing disc 26A).

The wall 46 of the ring gear 16 also can have ring gear holes 56 therein or therethrough for attaching the outer casing 26 to the ring gear 16. For example, ring gear holes 56 can have screw threads therein such that the outer casing elements 26A, 26B can be screw-secured to the ring gear 16, or can be smooth bores completely through the ring gear 16 such that a bolt can extend through both outer casing elements 26A, 26B and the ring gear 16 whereby the bolt and nut configuration can secure both of the outer casing elements 26A, 26B to the ring gear 16.

Figure 5:
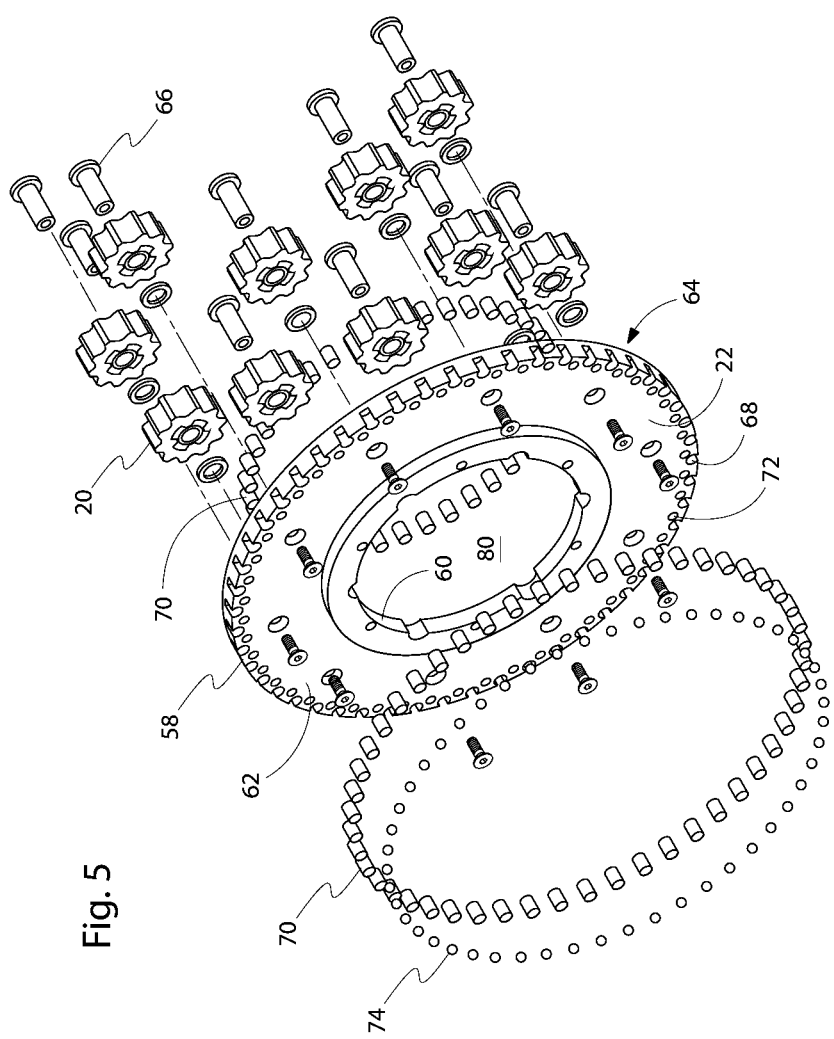
FIG. 5 shows an exploded view of a planet gear carrier and planet gears suitable for use with the present invention.
Figure 6:
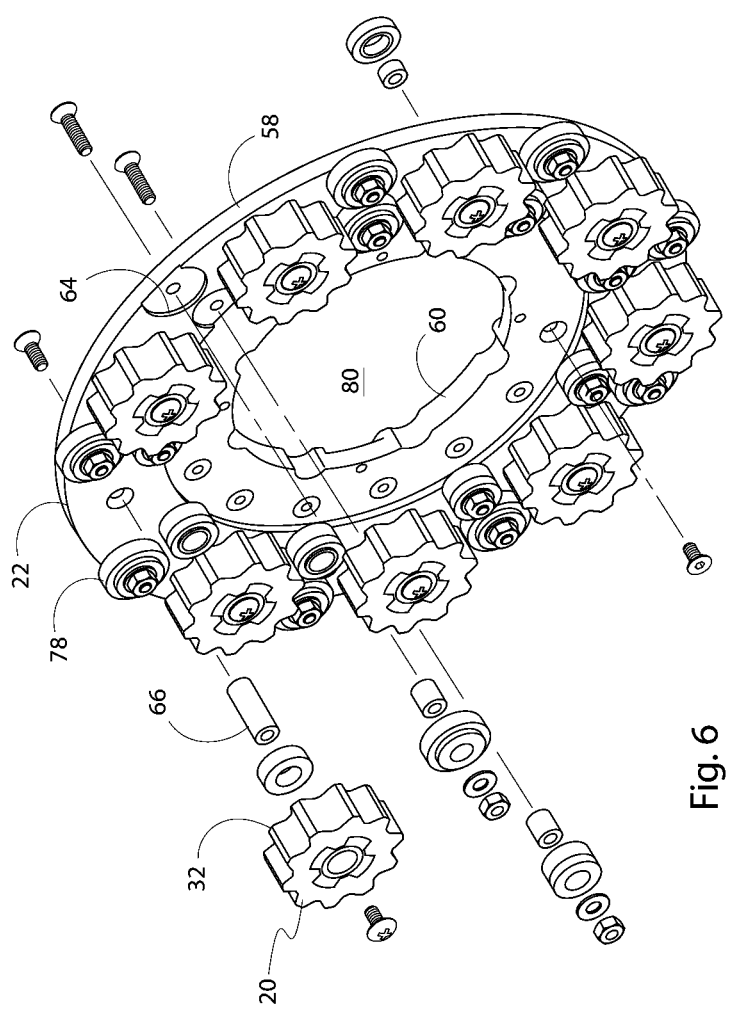
FIG. 6 shows an exploded view of an alternative planet gear carrier and planet gears suitable for use with the present invention.

FIGS. 5 and 6 show representative embodiments of the planet gear carrier 22. The planet gear carrier 22 is generally an annular ring or disc structure comprising an outer surface 58 on an outer diameter, an inner surface 60 on an inner diameter, a first face 62, a second face 64, and a thickness normal to the diameters. At least one, and preferably a plurality of, planet gear 20 are rotatably attached to the first face 62 of the planet gear carrier 22 via pinions 66 or the equivalent attached normal to the plane of the planet gear carrier 22, which is also normal to the diameters of the planet gear carrier 22 and to the first face 62. In other words, the plane of the planet gear carrier 22 diameters is coplanar with the planes of the attached planet gears 20. The outer diameter of the planet gear carrier 22 is smaller than the inner diameter of the ring gear 16 whereby the planet gear carrier 22 can rotate within the ring gear 16 without the outer edge of the planet gear carrier 22 touching the inner surface 44 (inner circumference) of the ring gear 16 or the teeth, bumps, or ridges 34 on the inner surface 44 (inner circumference) of the ring gear 16. The planet gears 20 are rotatably mounted on the second face 64 of the planet gear carrier 22 in a position such that at least a portion of the teeth, bumps, or ridges 32 of the planet gears 20 extend outward beyond the outer surface 58 and outer diameter of the planet gear carrier 22 whereby the teeth, bumps, or ridges 32 of the planet gears 20 extending outward beyond the outer surface 58 and outer diameter of the planet gear carrier 22 can interact with the teeth, bumps, or ridges 34 on the inner surface 44 of the ring gear 16.

First rod bearing holders 68 can be located along the outer circumference of the planet gear carrier 22 into which rod bearings 70 can be inserted. First rod bearing holders 68 can be structured such that a portion of rod bearings 70 inserted therein extend radially outward from the outer surface 58 of the planet gear carrier 22 towards the ring gear 16 (parallel to the plane of the planet gear carrier 22) and/or axially outward from the first face 62 of the planet gear carrier 22 towards the outer casing 26 (normal to the plane of the planet gear carrier 22). First ball bearing holders 72 can be located on the first face 62 of the planet gear carrier 22 proximal to the outer surface 58 (outer diameter) of the planet gear carrier 22 into which ball bearings 74 can be inserted. First ball bearing holders 72 can be structured such that a portion of ball bearings 74 inserted therein extend outward from the first face 62 of the planet gear carrier 22 towards the outer casing 26 (normal to the plane of the planet gear carrier 22). Second rod bearing holders 74 can be located on the second face 64 of the planet gear carrier 22 proximal to the inner diameter (inner circumference) of the planet gear carrier 22 into which rod bearings 70 can be inserted. Second rod bearing holders 76 can be structured such that a portion of rod bearings 70 inserted therein extend axially outward from the second face 64 of the planet gear carrier 22 towards the outer casing 26 (normal to the plane of the planet gear carrier 22). Bearings 70, 74 help prevent the planet gear carrier 22 from contacting other components of the device 10 and help allow the planet gear carrier 22 to rotate more freely, with less friction, and/or with more accuracy.

Alternatively, the planet gear carrier 22 can have roller bearings 78 attached to the second face 64 of the planet gear carrier 22. Roller bearings 78 replace the first rod bearings 68, and are preferably located between the planet gears 20. An outer portion of roller bearings 78 extends radially outward from the planet gear carrier 22 towards the ring gear 16 (parallel to the plane of the planet gear carrier 22). Bearings 78 help prevent the planet gear carrier 22 from contacting other components of the device 10, such as the ring gear 16, and help allow the planet gear carrier 22 to rotate more freely, with less friction, and/or with more accuracy.

The inner diameter of the planet gear carrier 22 is sufficiently large enough to allow the locking means 38, 40, the sun gear 18, the axle 54, and other necessary components of the device 10 to properly operate. As disclosed herein, the present invention 10 comprises locking means 38, 40 for locking the sun gear 18 relative to the ring gear 16 and for locking the planet gear carrier 22 relative to the swing arm 28 of the motorcycle frame 24. Portions of these locking means 38, 40 are located within or operate through the hole or passage 80 through the planet gear carrier 22 defined by the inner diameter (inner circumference) of the planet gear carrier 22.

The planet gears 20 are generally circular gears comprising teeth, bumps, or ridges 32 along an outer circumference. The teeth, bumps, or ridges 32 on planet gears 20 are sized to cooperate with the teeth, bumps, or ridges 34 on the inner surface 44 of ring gear 16. Planet gears 20 are rotationally attached to the second face 64 of the planet gear carrier 22 so that planet gears 20 are freely rotatable. As discussed herein, planet gears 20 are rotatably mounted on the second face 64 of the planet gear carrier 22 in a position such that at least a portion of the teeth, bumps, or ridges 32 of the planet gears 20 extend outward beyond the outer surface 58 and outer diameter of the planet gear carrier 22 whereby the teeth, bumps, or ridges 32 of the planet gears 20 extending outward beyond the outer surface 58 and outer diameter of the planet gear carrier 22 can interact with the teeth, bumps, or ridges 34 on the inner surface 44 of the ring gear 16. Any number of planet gears 20 can be used, preferably at least three for better stability, and typically between 3 and 12.

Figure 7:
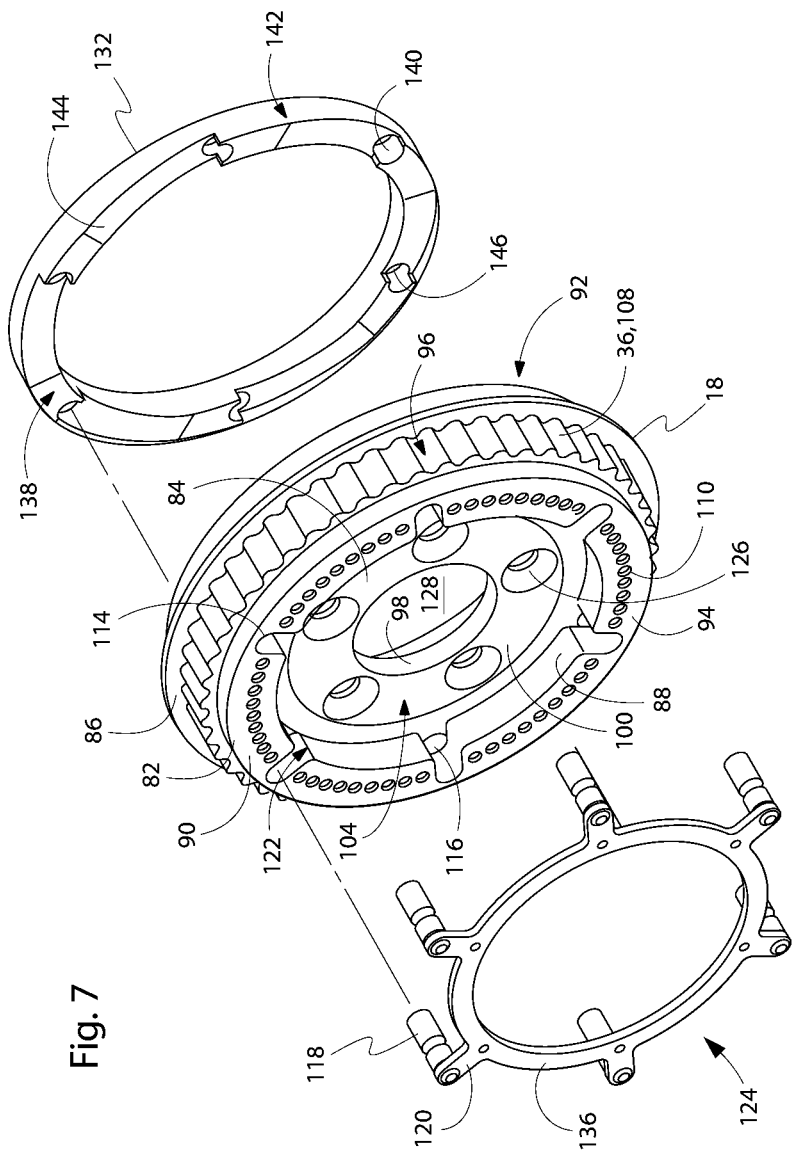
FIG. 7 shows an exploded view of a representative first locking means in relation to the sun gear.

FIG. 7 shows a representative embodiment of the sun gear 18. The sun gear 18 is a generally circular gear comprising an outer annular ring 82 portion and an inner annular hub 84 portion. Outer annular ring 82 portion comprises an outer surface 86 on an outer circumference, an inner surface 88 on an inner circumference, a first face 90, a second face 92, a thickness 94 between the outer surface 86 and the inner surface 88, and a height 96 between the first face 90 and the second face 92 of the outer annular ring 82. Inner annular hub 84 portion extends inwardly from the inner surface 88 of the outer annular ring 82, and comprises an inner surface 98 on an inner diameter, a first face 100, a second face 102, a thickness 104 between the inner surface 98 of the outer annular ring 82 and the inner surface 98 of the inner annular hub 84, and a height 106 between the first face 100 and the second face 102 of the inner annular hub 84. Outer annular ring 82 and inner annular hub 84 preferably are parts of the same unitary structure.

The outer surface 86 on the outer circumference of outer annular ring 82 portion of sun gear 18 comprises teeth, bumps, or ridges 108 that cooperate with the teeth, bumps, or ridges 32 on planet gears 20. For example, when the sun gear 18 is inserted into the interior of the array of planet gears 20 rotatably attached to the planet gear carrier 22, the teeth, bumps, or ridges 108 on the sun gear 18 fit within and cooperate with the teeth, bumps, or ridges 32 on the planet gears 20 whereby rotation of the planet gears 20 in a first rotational direction can cause the rotation of the sun gear 18 in a second rotational direction opposite the first rotational direction by the interaction of the respective teeth, bumps, or ridges 32 of the planet gears 20 and the teeth, bumps, or ridges 108 on the sun gear 18, particularly when the planet gear carrier 22 is held or locked is a stationary position.

Second ball bearing holders 110 can be located on the first face 90 of the sun gear 18 into which ball bearings 74 can be inserted. Second ball bearing holders 110 can be structured such that a portion of ball bearings 74 inserted therein extend outward from the first face 90 of the sun gear 18 towards a first portion 26A of the outer casing 26 (normal to the plane of the sun gear 18). Third ball bearing holders 112 can be located on the second face 92 of the sun gear 18 into which ball bearings 74 can be inserted. Third ball bearing holders 112 can be structured such that a portion of ball bearings 74 inserted therein extend outward from the second face 92 of the sun gear 18 towards a second portion 26B of the outer casing 26 (normal to the plane of the sun gear 18). Bearings 74 help prevent the sun gear 18 from contacting other components of the device 10, such as the outer casing 26, and help allow the sun gear 18 to rotate more freely, with less friction, and/or with more accuracy.

The inner surface 88 on the inner circumference of sun gear 18 comprises access ports or slots 114 as part of and/or leading to tunnels 116 through the height 96 of the sun gear 18, which ports or slots 114 and tunnels 116 allow for the operation of the first locking means 38. As disclosed herein, first locking means 38 slides axially relative to sun gear 18, with locking prongs 118 extending axially through ports or slots 114 and tunnels 116 and prong supports 120 extending radially out of the open sides 122 of ports or slots 114 in a direction radially inward towards the axial center of sun gear 18. The height 96 of outer ring 82 portion of sun gear 18 between first face 90 and second face 92 of sun gear 18 is equal to or greater than the height (length) of prongs 118 whereby when the prongs 118 and prong holder 124 combination of first locking means 38 is in the unlocked position, prong holder 124 is coplanar with, or interior of the plane of, first face 90 of sun gear 18, and prongs 118 are entirely within ports or slots 114 and tunnels 116 and do not extend out of tunnels 116 outward of second face 92.

The inner annular hub 84 portion of sun gear 18 is for attaching the sun gear 18 to the wheel 14 of the motorcycle, or other drive component. Inner annular hub 84 comprises a plurality of mounting holes 126 therethrough for cooperating with lugs on the wheel 14 or with lugs for mounting the wheel 14 to the device 10. Five mounting holes 126 are shown as this is a common number of mounting holes 126 and lugs. Inner annular hub 84 also comprises a central axial hole or passage 128 therethrough through which the axle 54 can extend. Central axial hole or passage 128 is coextensive with the inner surface 98 and the inner diameter of the inner annular hub 84, and the inner diameter of the inner annular hub 84 is greater than the diameter (thickness) of the axle 54 whereby the axle 54 will not contact the inner surface 98 of the inner annular hub 84. An axle guide sleeve 130, placed about axle 54, can be used as an additional spacer or as a bearing to further prevent axle 54 from contacting the inner surface 98 of inner annular hub 84.

FIG. 7 shows a representative embodiment of the first locking means 38. The first locking means 38 comprises prongs 118 extending from a prong holder 124, a locking base 132, and an actuating means 134. The first locking means 38 is for locking the sun gear 18 relative to the ring gear 16. An exemplary first locking means 38 can comprise prongs 118, such as pins, shafts, rods, bars, or the like, that extend through ports or slots 114 and tunnels 116 in the sun gear 18 into the locking base 132, which is secured (rigidly) to the first casing disc 26A of the outer casing 26, thereby locking the sun gear 18 rotationally relative to the ring gear 16. Prong holder 124 comprises a flat prong ring 136 having an outer diameter smaller than the inner diameter of outer annular ring 82 of sun gear 18. Prongs 118 are attached to the prong ring 136 via prong supports 120 that extend radially outward from the prom ring 136. Six prongs 118 attached to six prong supports 120 extending from the prong ring 136 are shown in the figures as an example. Prong supports 120 are coplanar with the prong ring 136, and the prongs 118 extend normal to the plane of the prong ring 136 and prong supports 120.

The outer diameter of the prong ring 136 is smaller than the inner diameter of the outer annular ring 82 of the sun gear 18 whereby the prong ring 136 can slide axially within the space defined by the inner circumference (inner surface 88) of the outer annular ring 82 of the sun gear 18 from a position proximal to or touching a first face 100 of the inner annular hub 84 of the sun gear 18, which is the locked position resulting in the forward drive configuration, to a position distal from the first face 100 of the inner annular hub 84 of the sun gear 18 and proximal to or coplanar with the first face 90 of the outer annular ring 82 of the sun gear 18, which is the unlocked position resulting in the reverse drive configuration. The combination of prong ring 136, prong supports 120, and prongs 118 preferably remain within the periphery of the sun gear 18, that is within the volume between the planes of the first face 90 and the second face 92 of the outer annular ring 82 of the sun gear 18, such that the combination of prong ring 136, prong supports 120, and prongs 118 does not interfere with the rotational motion of the planet gear carrier 22.

The locking base 132 is an annular structure or ring secured to or rigidly attached to and coaxial with the first casing disc 26A of the outer housing 26. For example, locking base 132 can be attached to first casing disc 26A via connecting pins 226. For another example, locking base 132 can be attached to first casing disc 26A via or to an attachment plate 230 that is securely attached to the first casing disc 26A.

A circular face 138 of the locking base 132 faces the second face 92 of the sun gear 18. The locking base 132 can comprise detents 140, such as holes, walls, ridges, stops, or the like, or an inner locking claw 142 (as the operational face of the locking base 132) for interacting with the prongs 118 of the first locking means 38. The use of a claw-type device such as inner locking claw 142 can allow for a smoother and/or more accurate connection for the first locking means 38 when locking the sun gear 18 relative to the ring gear 16. For example, the inner locking claw 142 can have ramps 144 leading to holes 146 whereby the prongs 118, or pins or shafts, on the prong ring 136 can contact and slide along the ramps 144 and be directed into the holes 146 for locking. More specifically, the locking base detents 140 are positioned about an imaginary circle equal to and concentric with an imaginary circle connecting the exits of the tunnels 116 through the sun gear 18 whereby when the prong ring 136 is in the locked position, prongs 118 can extend axially outward from the tunnels 116 through the sun gear 18 and into the locking base detents 140.

As the locking base 132 is attached to the first casing disc 26A of the outer housing 26, the sun gear 18 can rotate relative to the locking base 132 and the prongs 118 may not line up with the detents 140 at all times. Therefore, it is advantageous for the locking base 132 to have means for guiding the prongs 118 into the detents 140. A preferred means for guiding comprises slopes 144 on the circular face 138 of the locking base 132 between each of the detents 140. With such slopes 144, if prongs 118 are not exactly opposite detents 140 when moving from the unlocked position to the locked position, prongs 118 will contact slopes 144 and be guided into the detent 140 located at the bottom of the slope 144. The prongs 118 can have rounded ends or edges for contacting the slopes 144 to assist in this guiding. An alternative means for guiding is to round or funnel the edges of the detents 140, such as in the form of holes 146 on the circular face 138 without the use of ramps of slopes 144, whereby as the prongs 118 move along (rotate about) the face 138 of the locking base 132 as the sun gear 18 rotates relative to the locking base 132, the prongs 118 will catch in the rounded or funneled portions of the detents 140 (holes 146) thus stopping the rotation of the sun gear 18 relative to the locking base 132 and allowing the prong 118 to be more fully or fully inserted into the detents 140.

Figure 8:
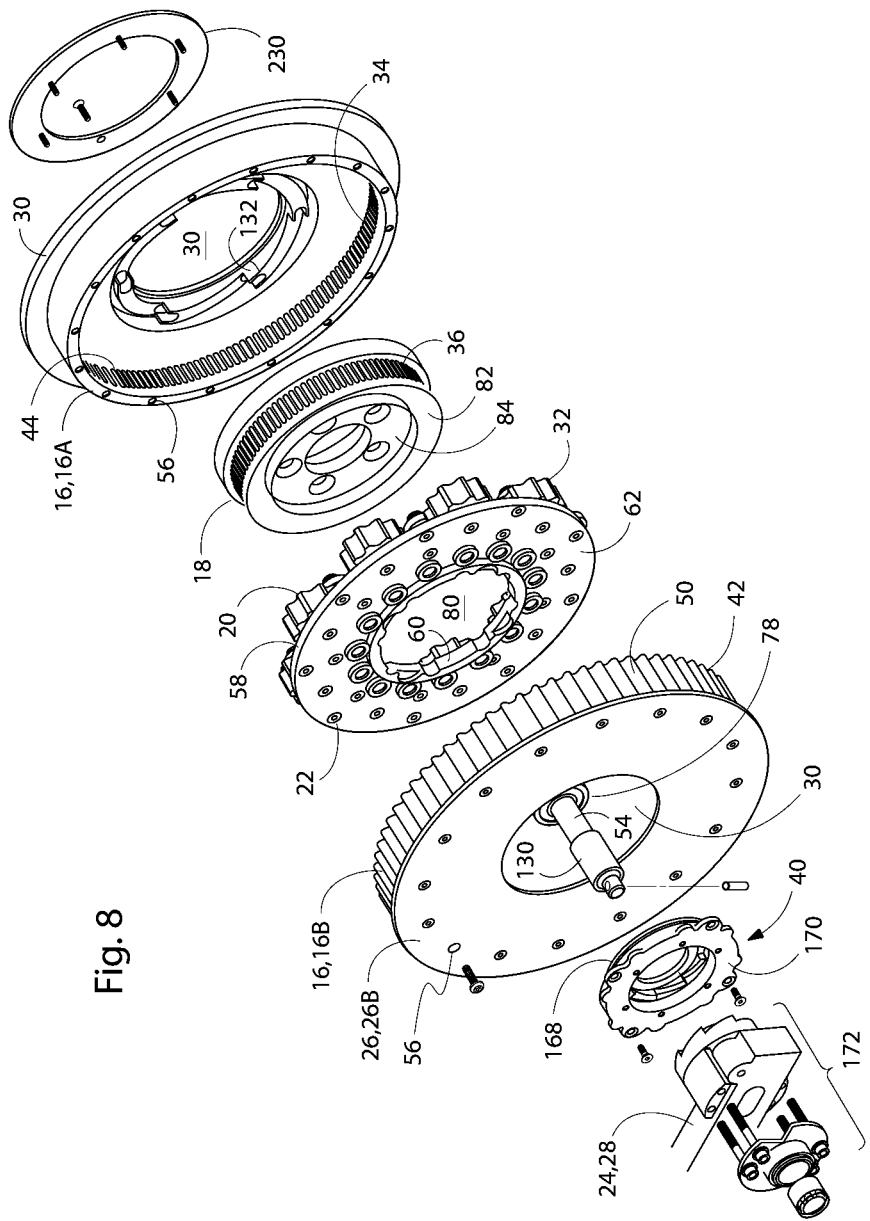
FIG. 8 shows an exploded view of the primary components of the present invention.
Figure 9:
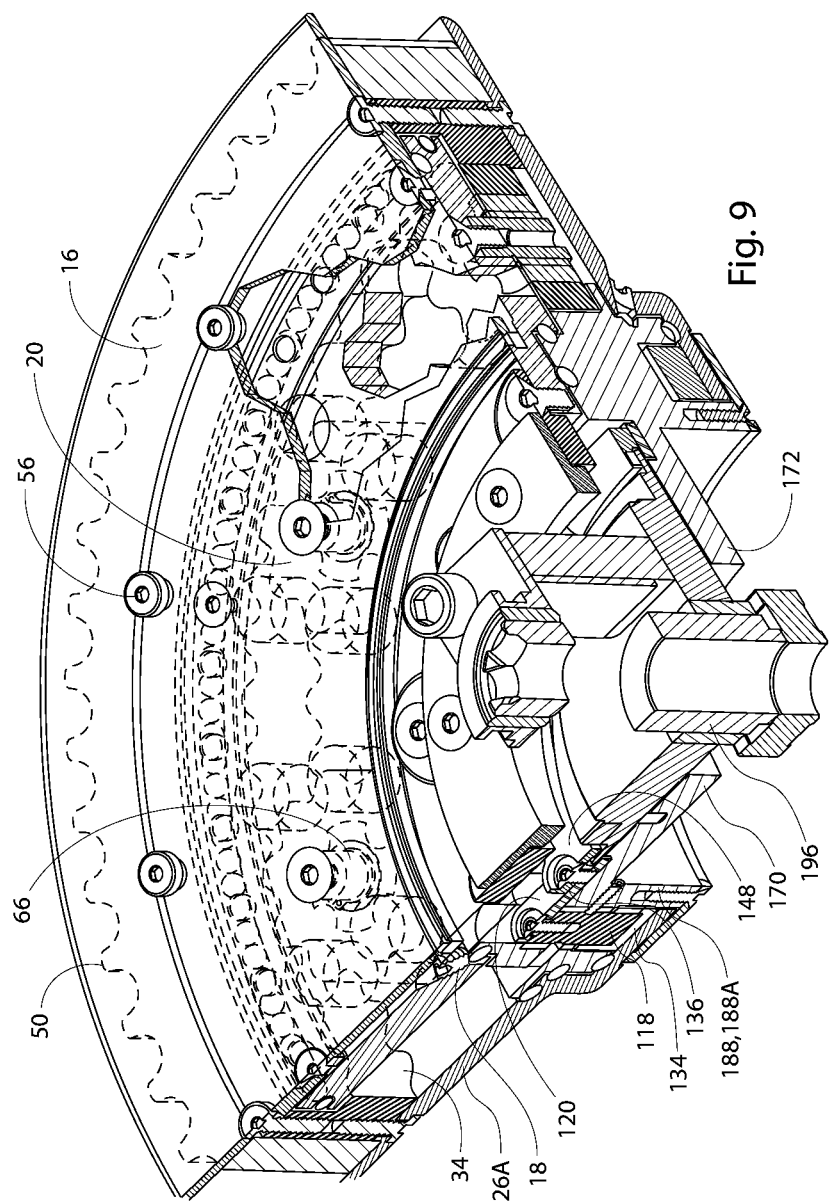
FIG. 9 shows a sectional view of the present invention.
Figure 10B:
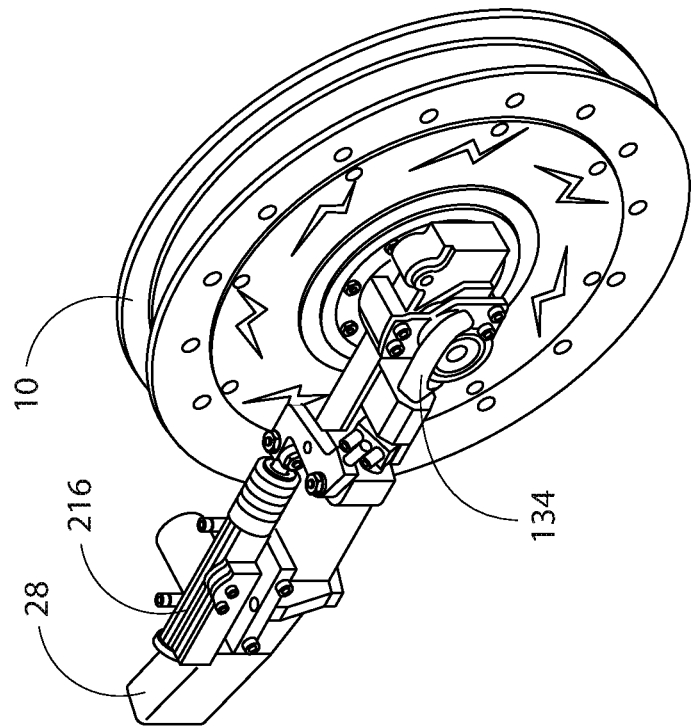
FIG. 10 shows perspective views of the present invention used in a reverse engaged (FIG. 10A) and forward engaged (FIG. 10B) position for use with a motorcycle.
Figure 10A:
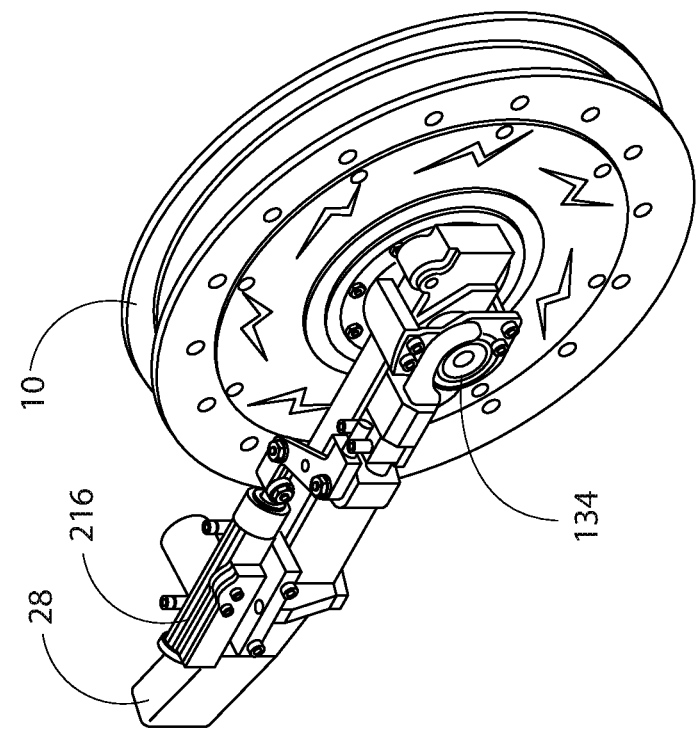
Figure 11A:
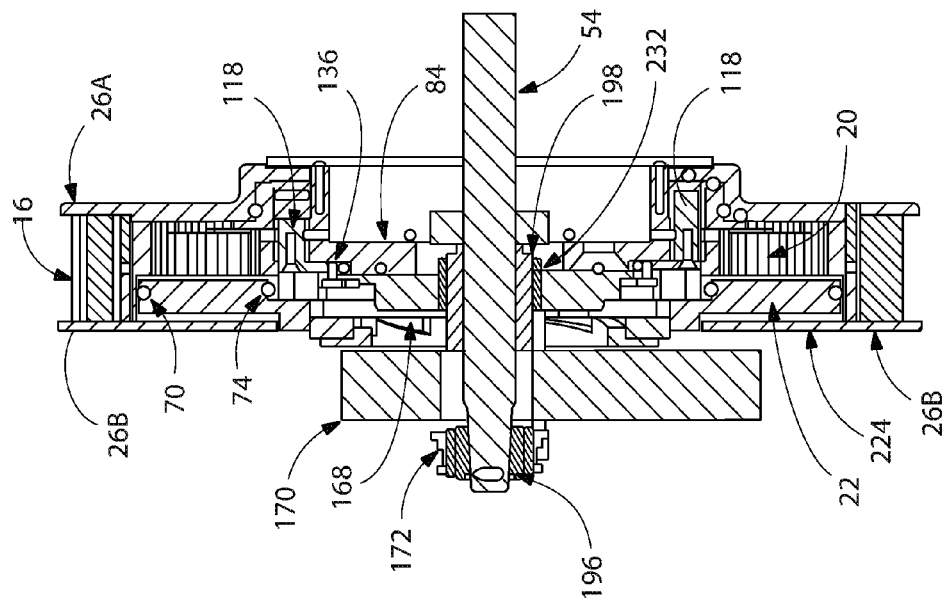
FIG. 11 shows sectional views of the present invention used in a reverse engaged (FIG. 11A) and forward engaged (FIG. 11B) position for use with a motorcycle.
Figure 11B:
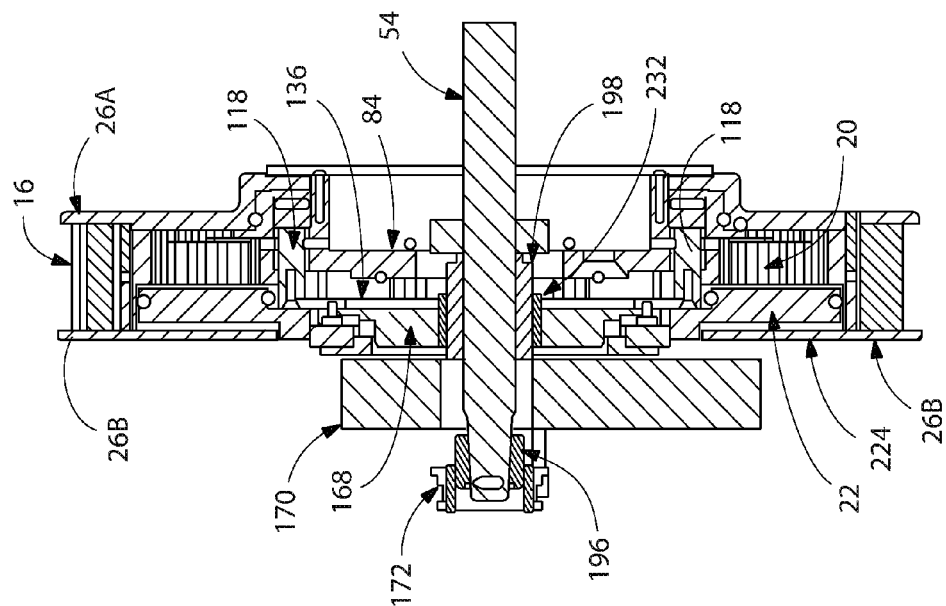
Figure 12:
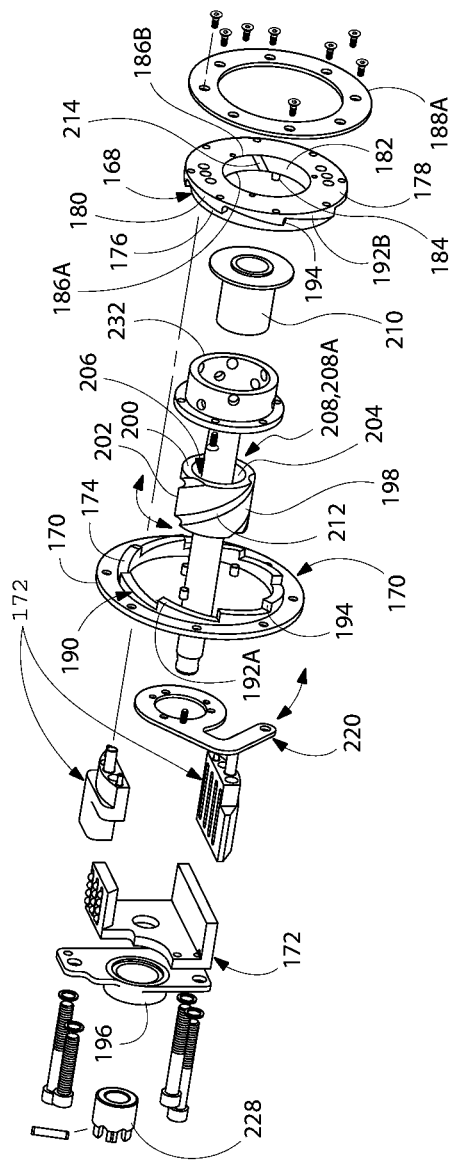
FIG. 12 shows an exploded view of a representative second locking means and activating means suitable for use with the present invention.
Figure 13:
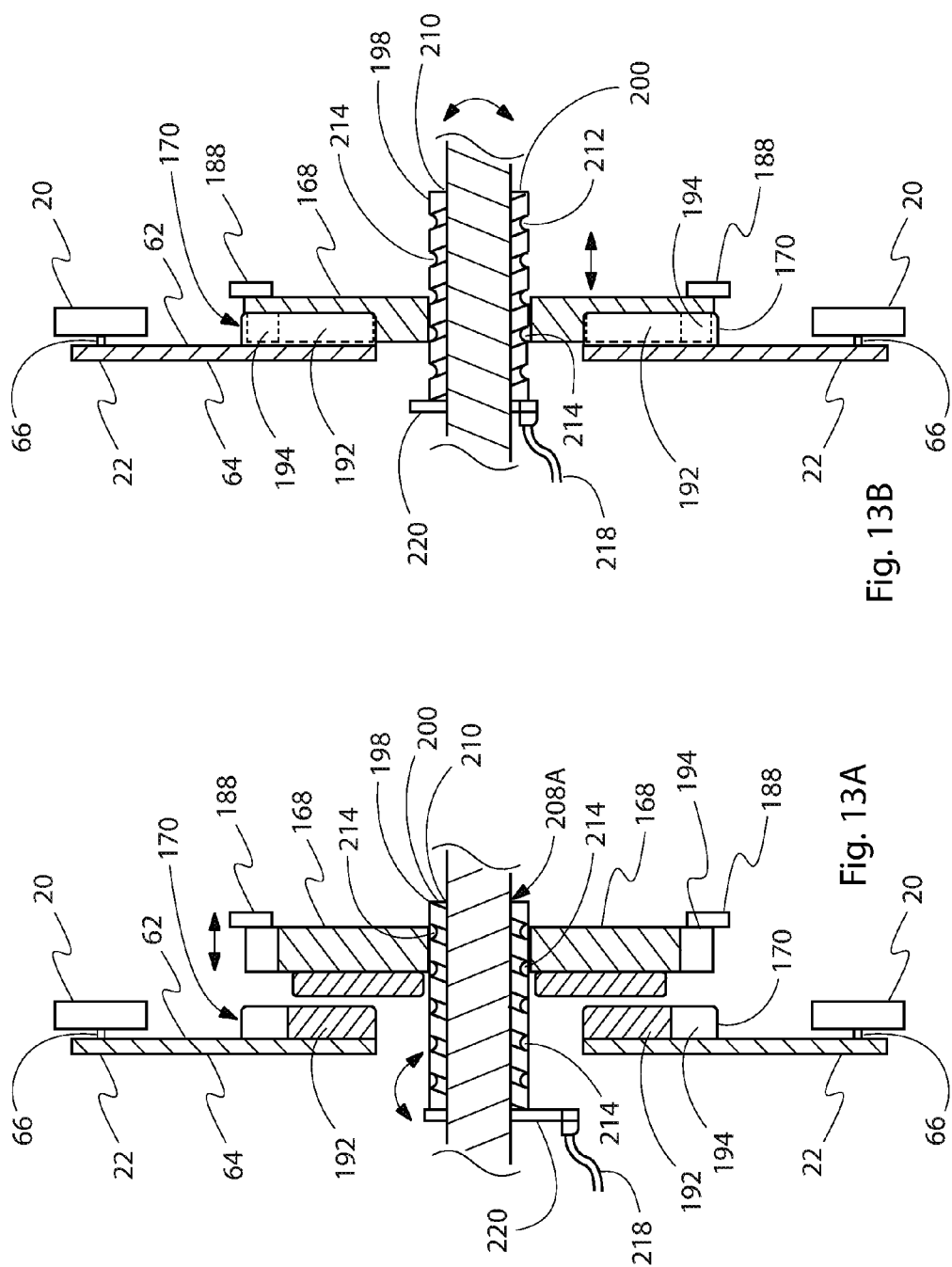
FIG. 13 shows sectional views of the action of a representative second locking means in the forward engaged position (FIG. 13A) and the reverse engaged position (FIG. 13B).
Figure 14:
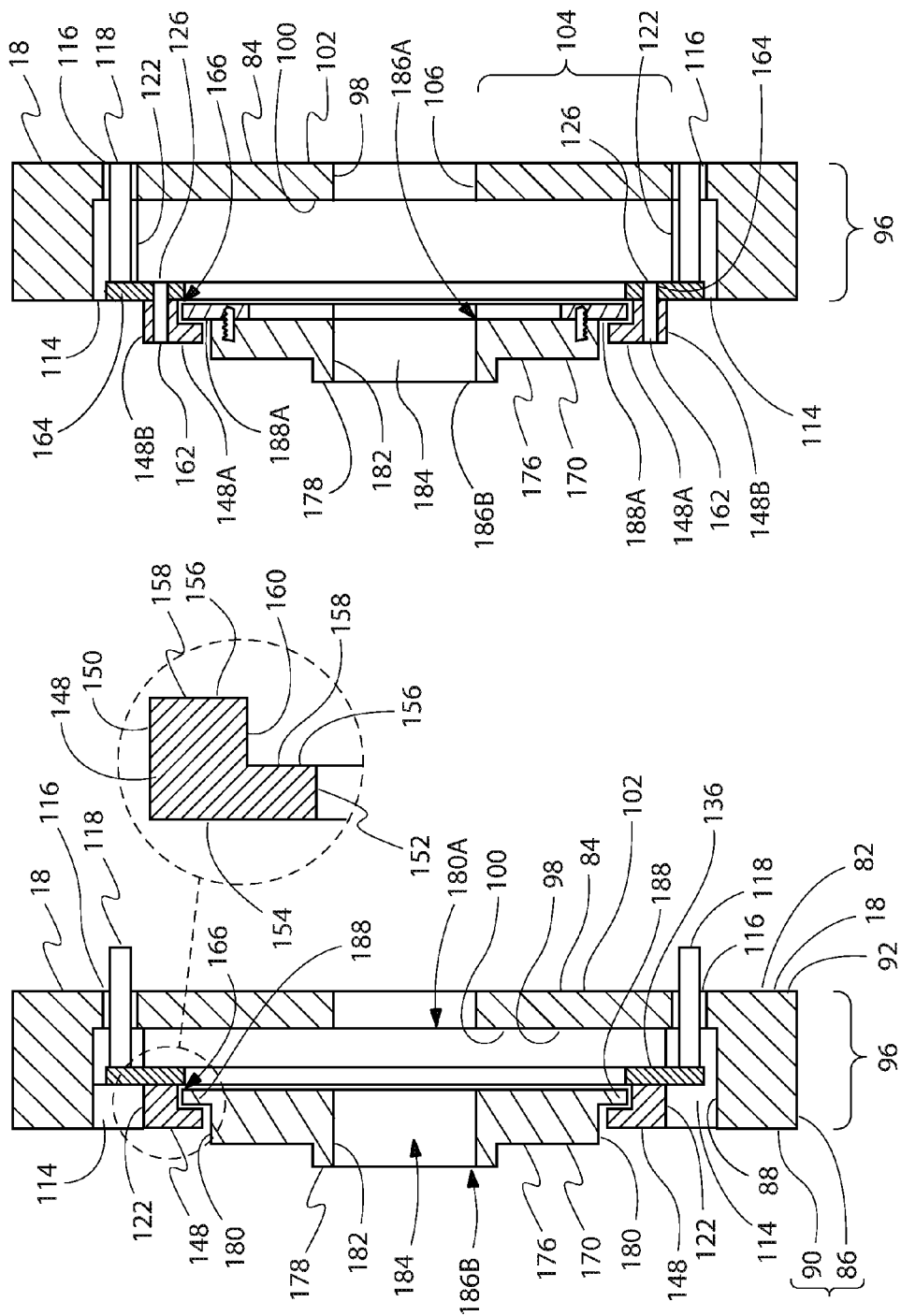
FIG. 14 shows sectional views of a representative connection between a first locking means and a second locking means with a one-piece second claw ring in the forward engaged position (FIG. 14A) and a two-piece second claw ring in the reverse engaged position (FIG. 14B).
Figure 15:
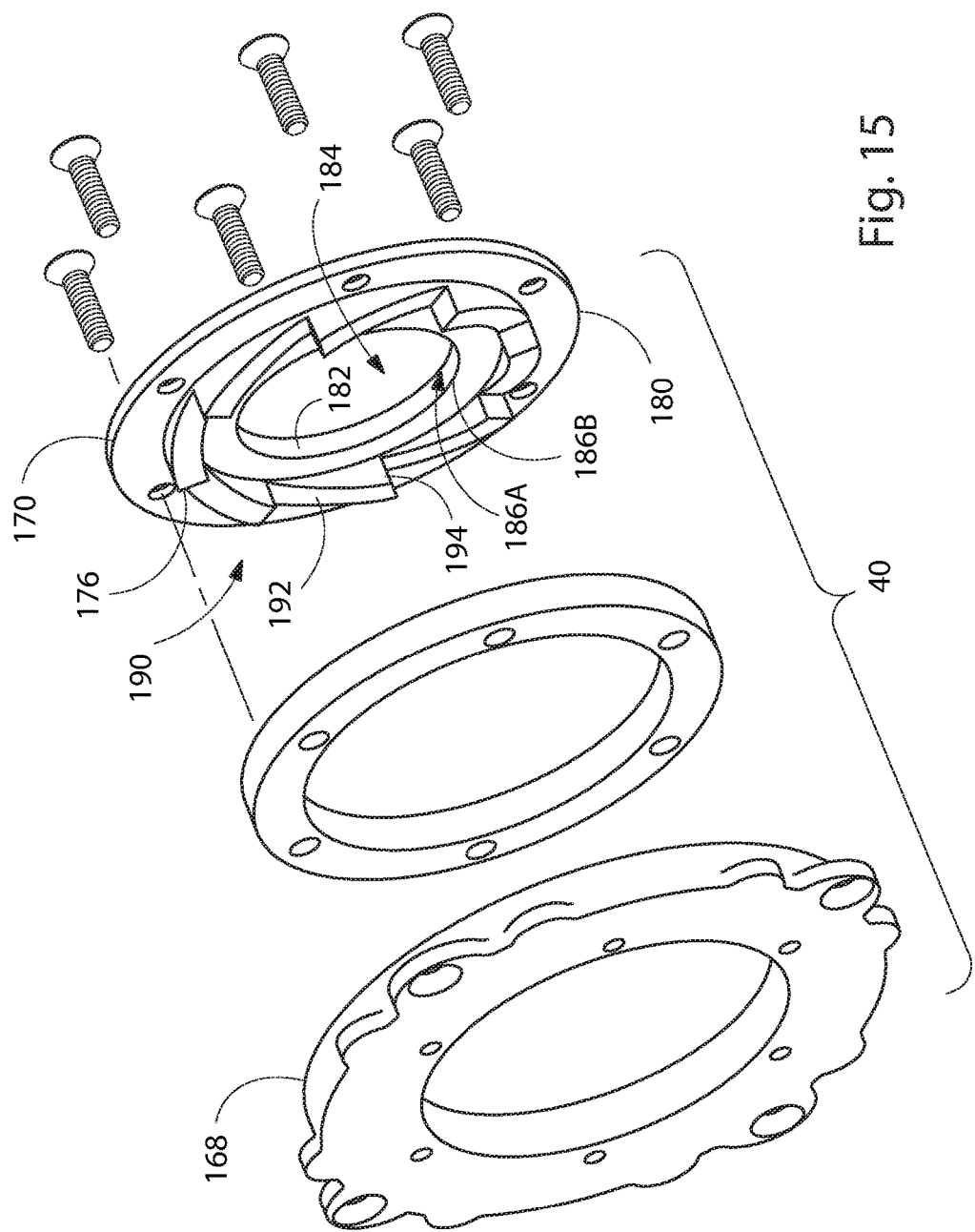
FIG. 15 shows an exploded view of a portion of an alternative second locking means suitable for use with the present invention.
Figure 16:
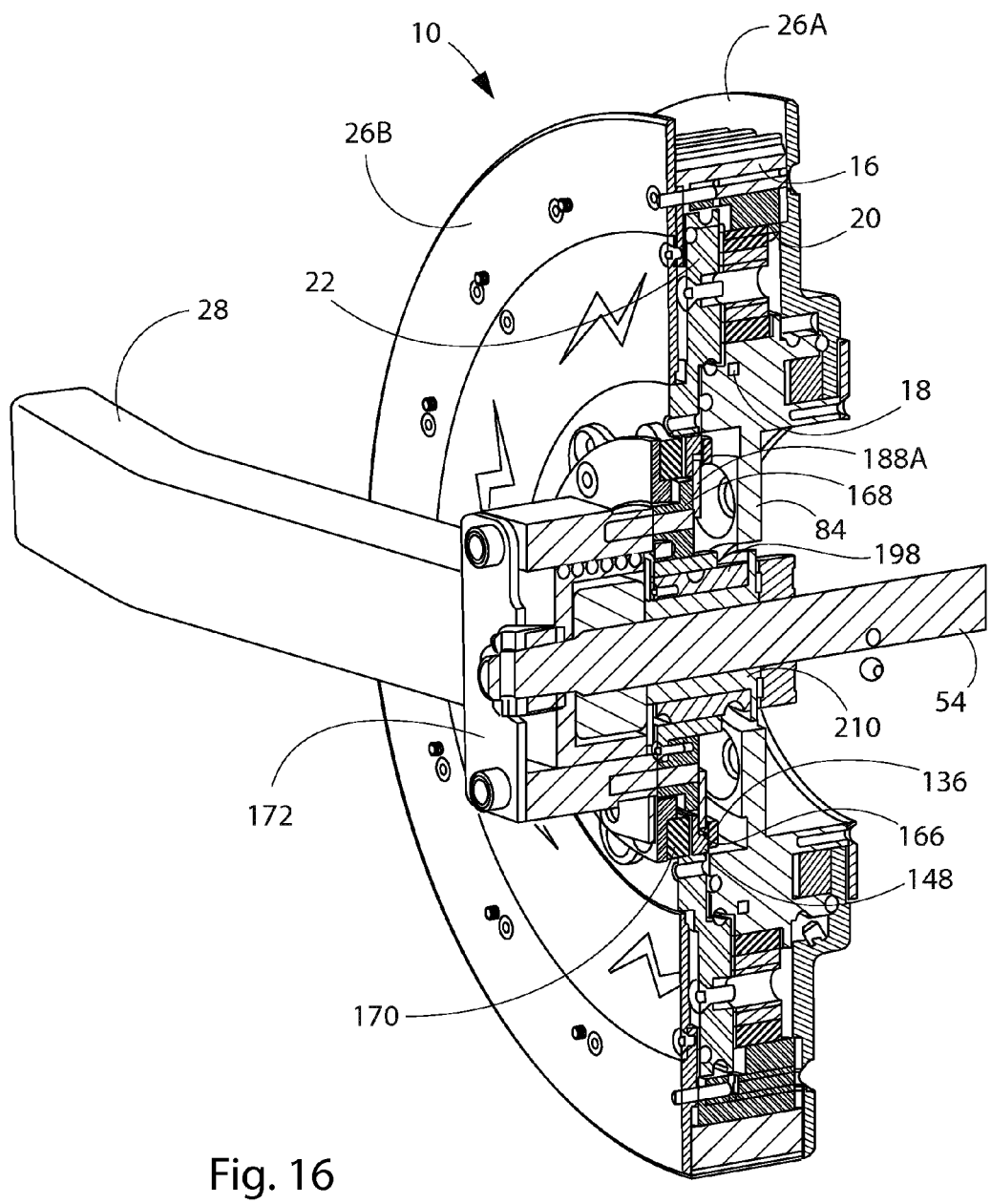
FIG. 16 shows a sectional view of the present invention mounted on a motorcycle swing arm.
Figure 17:
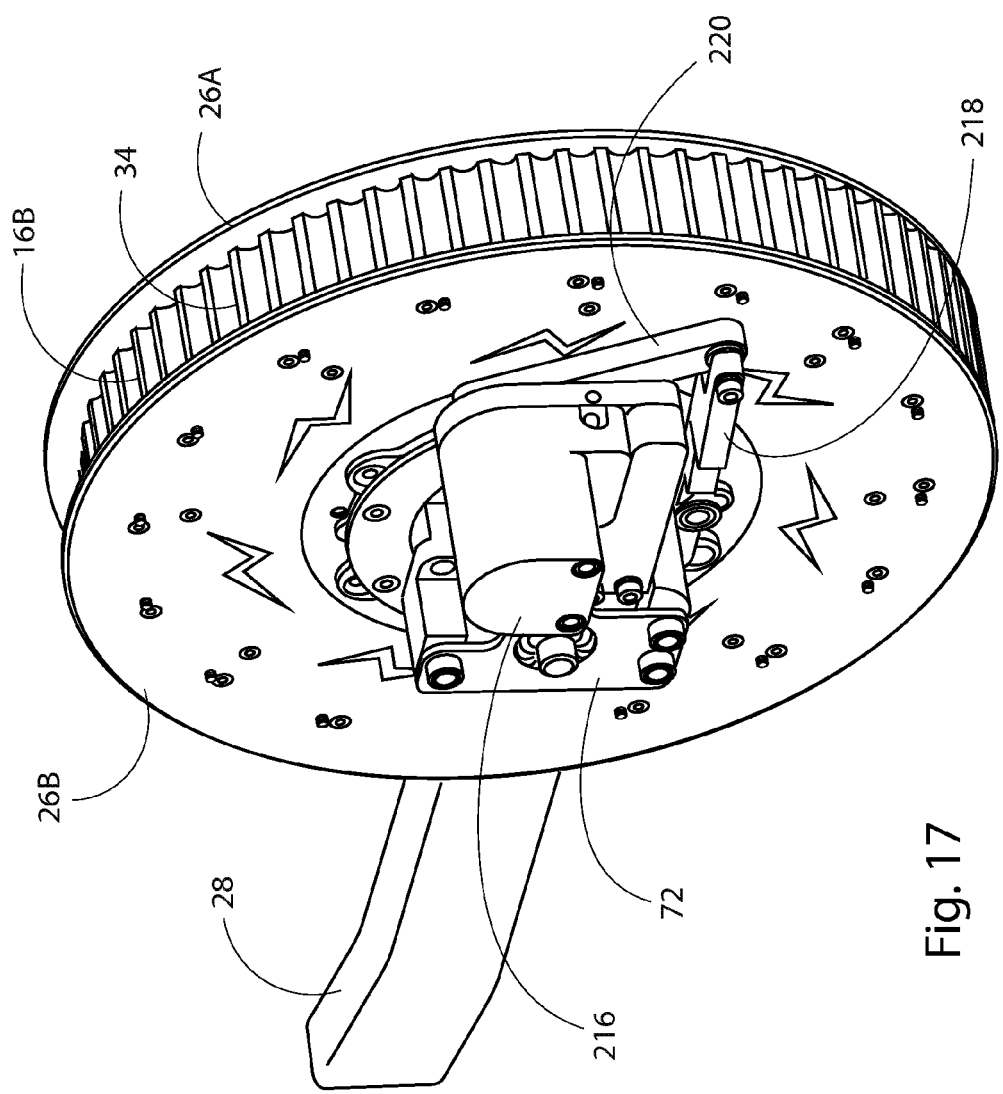
FIG. 17 shows a perspective view of the present invention mounted on a motorcycle swing arm.

FIGS. 8 through 17 show how the various components of the metadrive 10 connect to and interact with each other. FIG. 8 shows an exploded view of the primary components of the present invention 10, while FIG. 9 shows a sectional view of the present invention 10. FIG. 10 shows perspective views of the present invention 10 used in a reverse engaged (FIG. 10A) and forward engaged (FIG. 10B) position for use with a motorcycle, and FIG. 11 shows sectional views of the present invention 10 used in a reverse engaged (FIG. 11A) and forward engaged (FIG. 11B) position for use with a motorcycle. FIG. 12 shows an exploded view of a representative second locking means 40 and activating means, and FIG. 13 shows sectional views of the action of a representative second locking means 40 in the forward engaged position (FIG. 13A) and the reverse engaged position (FIG. 13B). FIG. 14 shows sectional views of a representative connection between a first locking means 38 and a second locking means 40 with a one-piece second claw ring 170 in the forward engaged position (FIG. 14A) and a two-piece second claw ring 170 in the reverse engaged position (FIG. 14B). FIG. 15 shows an exploded view of a portion of an alternative second locking means 40. FIG. 16 shows a sectional view of the present invention 10 mounted on a motorcycle swing arm 28, and FIG. 17 shows a perspective view of the present invention 10 mounted on a motorcycle swing arm 28.

The prong ring 136 is operationally connected to the actuating means 134 whereby the actuating means 134 can move the prong ring 136 from the position proximal to or touching the first face 100 of the inner annular hub 84 of the sun gear 18, which is the locked position resulting in the forward drive configuration, to the position proximal to or coplanar with the first face 90 of the outer annular ring 82 of the sun gear 18, which is the unlocked position resulting in the reverse drive configuration. As disclosed herein, the first locking means 38 may be operationally connected to the second locking means 40 whereby the actuating means 134 concurrently actuates both the first locking means 38 and the second locking means 40.

A first manner of operationally connecting the prong ring 136 to the second locking means 40 comprises using a shaped bronze (or equivalent low friction nearing material) bearing ring 148 attached to the prong ring 136. An exemplary shaped bronze bearing ring 148 comprises an outer circumferential surface 150 having a first circumference, an inner circumferential surface 152 having a second circumference, a flat front face 154 extending between and normal to both of the first and second circumferential surfaces 150, 152, and a stepped rear face 156 extending between the first and second circumferential surfaces 150, 152. The stepped surface of the rear face 156 steps down from the outer circumferential surface 150 to the inner circumferential surface 152 in that the thickness of the bearing ring 148 is greater between the front face 154 and the rear face 156 proximal to the outer circumferential surface 150 (the thickness of the outer step tread 158A) than the thickness of the bearing ring 148 proximal to the inner circumferential surface 152 (the thickness of the inner step tread 158B). A middle circumferential surface 160 (the step riser) is located approximately midway between the outer circumferential surface 150 and the inner circumferential surface 152 on the rear face 156.

The bearing ring 148 comprises an outer diameter extending to the outer circumference 150 that is approximately the same as the outer diameter of the prong ring 136, and an inner diameter that is approximately equal to or smaller than the inner diameter of the prong ring 136. The middle circumferential surface 160 of the bearing ring 148 has a diameter (the riser diameter) that is smaller than the outer diameter of the prong ring 136 and larger than the inner diameter of the prong ring 136. The bearing ring 148 can be attached to the surface of the prong ring 136 opposite the prongs 118 via known attachment means, such as screws extending through holes 162 in the bearing ring 148 into attachment holes 164 in the prong ring 136. When the bearing ring 148 is attached to the prong ring 136, an annular groove 166 is formed between the bearing ring 148 and the prong ring 136. As discussed herein, a circular or radial tongue 188 portion of a component of the second locking means 40 (preferably the second claw ring 170) rotatably fits within the annular groove 166.

A second manner of operationally connecting the prong ring 136 to the second locking means 40 comprises using a flat spacer ring 148B and a flat bronze bearing ring 148A instead of the shaped bronze bearing ring 148. The flat bronze bearing ring 148A comprises an outer diameter extending to the outer circumference that is approximately the same as the outer diameter of the prong ring 136, and an inner diameter that is approximately equal to or smaller than the inner diameter of the prong ring 136. The spacer ring 148B comprises an outer diameter equal to or approximately equal to the outer circumference of the flat bearing ring 148A, and an inner diameter that is equal to or approximately equal to the diameter of the middle circumferential surface 160 (the riser diameter) of the bearing ring 148 of the first manner previously disclosed. The flat bearing ring 148A and the spacer ring 148B can be attached to the surface of the prong ring 136 opposite the prongs 118 via known attachment means, such as screws extending through holes 162 in the flat bearing ring 148A and the spacer ring 148B into attachment holes 164 in the prong ring 136, with the spacer ring 148B between the flat bearing ring 148A and the prong ring 136. When the flat bearing ring 148A and the spacer ring 148B are attached to the prong ring 136, an annular groove 166 is formed between the flat bearing ring 148A and the prong ring 136. As discussed herein, a circular or radial tongue 188 portion of a component of the second locking means 40 (preferably the second claw ring 170) rotatably fits within the annular groove 166. The flat spacer ring 148A also can be made of bronze.

FIG. 12 shows a representative embodiment of the second locking means 40. The second locking means 40 comprises a first claw ring 168, a second claw ring 170, a mounting yoke 172, and an actuating means 134. The second locking means 40 is for locking the planet gear carrier 22 relative to the swing arms 28 of the motorcycle frame 24. The first claw ring 168 is an annular structure or ring secured to or rigidly attached to the planet gear carrier 22, and preferably to the first face 62 of the planet gear carrier 22, and coaxial with the planet gear carrier 22. As disclosed herein, the planet gear carrier 22 has an inner surface 60 (inner circumference), which defines a port or passage 80 through the planet gear carrier 22. The first claw ring 168 comprises a first circular claw face 174 for cooperating with a second circular claw face 176 on the second claw ring 170. The first circular claw face 174 of the first claw ring 168 extends through the planet gear carrier port or passage 80 and faces internal of the ring gear 16 and towards the first disc casing 26A of the outer casing 26. The first claw ring 168 therefore is secured to and rotates (turns or spins) with the planet gear carrier 22.

The second claw ring 170 is an annular structure or sleeve operationally connected to the actuating means 134 and slidably oriented on the axle 54. Actuation of the actuating means 134 causes the second claw ring 170 to slide axially relative to the device 10 and axially along the axle 54. The second claw ring 170 is a cylinder or sleeve comprising a cylinder wall 178 with an outer surface 180 and an inner surface 182, a hollow interior 184 surrounded by the cylinder wall 178, and two open ends 186. The first open end 186A comprises a second circular claw face 176 for cooperating with the first circular claw face 174 of the first claw ring 168. The second claw ring 170 is mounted on the axle 54 such that the second circular claw face 174 of the second claw ring 170 faces towards the first circular claw face 174 of the first claw ring 168, namely towards the actuating means 134.

The second claw ring 170 further comprises a circular or radial tongue 188 extending outwardly from the second open end 186B normal to the cylindrical wall 178. The radial tongue 188 preferably extends completely about the circumference of the second open end 186B, at the second open end 186B, whereby an outer surface of the radial tongue 188 and the second open end 186B are coplanar, said plane being perpendicular to the axis of the second claw ring 170. The second claw ring 170 and the radial tongue 188 preferably are a one-piece construction. Alternatively, a separate radial tongue 188A component can be securely attached to or at the second open end 186B so as to form a two-piece construction having the same general dimensions of a one-piece construction. The radial tongue 188, 188A is sized so as to rotatably fit within the annular groove 166 formed between the bearing ring 148 and the prong ring 136. In this manner, the prong ring 136 and the second claw ring 170 are rotatably connected to each other by the low friction (bronze) bearing ring 148 whereby the prong ring 136 can rotate relative to the non-rotating second claw ring 170. The tongue 188, 188A also can be manufactured from bronze or another low friction material.

More specifically, the circular claw faces 174, 176 of the first and second claw rings 168, 170 are generally the same size, having generally the same circular claw face 174, 176 diameters, such that the first and second claw faces 174, 176 operationally cooperate with each other. For example, each of the claw rings 168, 170 comprise detents 190 comprising slopes 192 and walls 194, for cooperating with each other.

More specifically, the claw ring detents 190 are positioned about imaginary circles that are equal to and concentric with each other. Preferably, there are an equal number of detents 190 on each circular claw face 174, 176 such that the circular claw faces 174, 176 can operationally cooperate with each other. When the device 10 is being actuated into the reverse drive configuration, the circular claw faces 174, 176 engage each other, and the slopes 192A on the first circular claw face 174 of the first claw ring 168 contacts the slopes 192B on the second circular claw face 176 of the second claw ring 170. As the first claw ring 168 rotates relative to the second claw ring 170, the slopes 192 of the circular claw ring faces 174, 176 continue to engage each other and the walls 194 of the circular claw faces 174, 176 eventually meet and contact each other. As the second claw ring 170 does not rotate, once the walls 194 of the circular claw faces 174, 176 meet, the first claw ring 168 stops rotating, thus stopping the planet gear carrier 22 from rotating. As disclosed herein, the stopping of the planet gear carrier 22 from rotating causes the device 10 to rotate the drive component 14 (wheel and tire) in the reverse direction.

Alternatively, the first locking means 38 and the second locking means 40 can be combined into a single locking means. When the locking means is in a first position for producing a drive propulsion in a first direction, the ring gear 16 and the sun gear 18 are locked relative to each other and the planet gear carrier 22 and the swing arms 28 are not locked relative to each other, and when the locking means is in a second position for producing a drive propulsion in a second direction, the ring gear 16 and the sun gear 18 are not locked relative to each other and the planet gear carrier 22 and the swing arms 28 are locked relative to each other.

Alternatively, one of the circular claw faces 174, 176 can comprise pins and the other circular claw face 176, 174 can comprise holes into which the pins can fit. Also alternatively, each of the circular claw faces 174, 176 can have ridges and valleys in the manner of a face gear. Also alternatively, the circular claw faces 174, 176 can be structured and act as cooperating clutch plates.

As disclosed herein the second claw ring 170 is operationally connected to the actuating means 134. While the second claw ring 170 can move axially along the axle 54, and relative to the device 10, the second claw ring 170 does not rotate about the axle 54. In preferred embodiments, the axle 54 is a static axle that does not rotate. Instead, the wheel 14 comprises an axle bearing 196 allowing the wheel 14 to be rotatably mounted on the axle 54 and rotate about the axle 54. Alternatively, the axle 54 can be a freely rotating, undriven, axle. The wheel 14 (drive component) is supported by the axle 54. The device 10 is mounted to the wheel 14 and is not directly supported by the axle 54, with the axle 54 extending through axial ports through various components of the device 10. The device 10 can comprise optional bearings 196 or low friction spacers between various components of the device 10 (for example, the sun gear 18) and the axle 54 to assist in eliminating unwanted or extraneous radial movement of the device 10 relative to the axle 54.

The second claw ring 170 can be slidably mounted relative to the axle 54 using roller bearings, low-friction bearings, sleeve bearings, or, preferably, a squirm or screw gear 198 (together referred to as a squirm gear). In the embodiment using a squirm gear 198, the second claw ring 170 is operationally mounted on the squirm gear 198, and the squirm gear 198 is operationally attached to the actuating means 134. The squirm gear 198 is a cylindrical structure comprising a cylinder wall 200 with an outer surface 202 and an inner surface 204, a hollow interior 206 surrounded by the cylinder wall 200, and two open ends 208. The squirm gear 198 is located on the axle 54, namely, the axle 54 extends through the hollow interior 206. The inner surface 204 of the cylindrical wall 200 can comprise a low friction coating, or the entire squirm gear 198 can be manufactured from a low friction material, whereby the squirm gear 198 can rotate on the axle 54. Alternatively, a sleeve bearing 210 or low-friction sleeve can be located within the hollow interior 206 of the squirm gear 198 so as to allow the squirm gear 198 to rotate relative to the axle 54.

The outer surface 202 of the cylindrical wall 200 of the squirm gear 198 can comprise a screw thread 212 or helical element extending at least partially between the two open ends 208. As disclosed herein, the screw thread 212 on the squirm gear 198 cooperates with a cooperative screw thread 214 on the inner surface 182 of the cylindrical wall 178 of the second claw ring 170. Specifically, the screw thread 212 on the outer surface 202 of the squirm gear 198 cooperates with the mating screw thread 214 on the inner surface 182 of the cylindrical wall 178 of the second claw ring 170 whereby a rotational movement of the squirm gear 198 (about the axle 54) causes a linear (axial) movement of the second claw ring 170 (along the axle 54). As such, rotating the squirm gear 198 in a first rotational direction will cause the second claw ring 170 to move in a first axial direction (for example to engage the first and second circular claw faces 174, 176) and rotating the squirm gear 198 in a second rotational direction opposite the first rotational direction will cause the second claw ring 170 to move in a second axial direction opposite the first axial direction (for example to disengage the first and second circular claw faces 174, 176).

In the alternative embodiment using roller bearings, low friction bearings, sleeve bearings or the like 210, the inner surface 182 of the cylindrical wall 178 of the second claw ring 170 can comprise a low friction coating, or the entire second claw ring 170 can be manufactured from a low friction material, whereby the second claw ring 170 can slide axially on the axle 54. Alternatively, a sleeve bearing 232 or low-friction sleeve can be located with the hollow interior 184 of the second claw ring 170 so as to allow the second claw ring 170 to slide along and relative to the axle 54.

The first locking means 38 and the second locking means 40 are actuated concurrently, preferably by the same actuating means 134, when shifting the motorcycle from forward to reverse and vice versa, namely, from the forward drive configuration to the reverse drive configuration. Specifically, for the invention 10 to operate in the designed manner, the ring gear 16 and the sun gear 18 must be locked relative to each other and the planet gear carrier 22 and the swing arms 28 must not be locked relative to each other when the device 10 is in the forward drive configuration, and the ring gear 16 and the sun gear 18 must not be locked relative to each other and the planet gear carrier 22 and the swing arms 28 must be locked relative to each other when the device 10 is in the reverse drive configuration. As the device 10 is constructed with all operative parts coaxial with each other (and coaxial with the motorcycle axle 54 supporting the wheel and tire combination 14), a single actuating means 134 can operate the first and second locking means 38, 40 concurrently.

The actuating means 134 is provided for activating the first and second locking means 38, 40. An exemplary actuating means 134 can comprise a solenoid or a motor 216, or a mechanical connection 218. For an example, a mechanical connection 218 can be activated to rotate a squirm gear 198 thereby causing the first and second locking means 38, 40 to be moved from the forward drive configuration to the reverse drive configuration. For example, a solenoid or motor 216 can be activated to directly move the first and second locking means 38, 40 from the forward drive configuration to the reverse drive configuration, and vice versa, in a linear manner along the axle 54. An actuating means activation switch 134A can be located on the handlebars of the motorcycle, for convenience, to activate the actuating means.

In an embodiment utilizing the squirm gear 198, the actuating means 134 causes the squirm gear 198 to rotate. Such an actuating means 134 can comprise a motor or solenoid 216 attached to the swing arm 28 or frame 24 of the motorcycle via the yoke 172, which motor or solenoid 216 directly rotates the squirm gear 198 or indirectly rotates the squirm gear 198 using a connection, such as a connecting lever, rod, or structure 220. The rotation of the squirm gear 198 causes the second claw ring 170 to move axially (linearly) along the axle 54. In an embodiment using roller bearings, low friction bearings, sleeve bearings or the like 210, the actuating means 134 is connected directly to the second claw ring 170, or indirectly via a rod or other structure 220. Such an actuating means 134 can comprise a motor or solenoid 216 attached to the swing arm 28 or frame 24 of the motorcycle, which motor or solenoid 216 directly or indirectly slides the second claw ring 170 axially (linearly) along the axle 54. A manual cable system 218, or the equivalent, can be used instead of a motor or solenoid 216 as an actuating means 134, with the manual system 218 being operationally attached either to the squirm gear 198 or to the second claw ring 170. With a manual system 218, a user would pull on a cable or squeeze a lever, which would act on the rod or other structure 220, or on the squirm gear 198 itself, in much the same way the motor or solenoid 216 would act on the rod or other structure 220, or on the squirm gear itself.

Exemplary embodiments of the invention (device 10) are configured to be rotatably mounted on a static axle 54, such as the axle 54 extending between the rear swing arms 28 of a motorcycle. Such an axle 54 typically is mounted in a static configuration between the swing arms 28, meaning that the axle 54 is either bolted between the swing arms 28 or is journaled between the swing arms 28 in a non-driven manner in that the axle 54 is not driven by the motor 12 but merely acts as a support for the wheel and tire combination 14. In one exemplary configuration, the axle 54 is non-rotatably attached to the swing arms 28 and the wheel and tire combination 14 is rotatably mounted on the axle 54. In another exemplary configuration, the axle 54 is rotatably attached to the swing arms 28 and the wheel and tire combination 14 is rotatably mounted to the axle 54. In another exemplary combination, the axle 54 is non-rotatably attached to the wheel 14 and journaled into the swing arms 28 such that the wheel 14 and axle 54 together rotate relative to the swing arms 54. The axle 54 can be secured to the swing arms 28 in a conventional manner via axle bolts and nuts 228.

The outer casing 26, and thus the planetary gear system and all other internal components, is sized and structured to fit between the rear wheel and tire combination 14 and a swing arm 28 of a conventional motorcycle without any alteration to the basic structure of the frame 24 and swing arms 28 of the motorcycle. Thus, the present invention 10 is sized and structured to be fitted to a motorcycle without the need for altering the motorcycle frame 24. In effect, the present invention 10 is sized and structured to fit on a motorcycle as a replacement for the rear drive sprocket of the motorcycle.

The present invention 10 is rigidly secured to the rear wheel 14 (or other drive component) via the sun gear 18 and rotatably mounted on an axle 54 that is secured between the swing arms 28 of the motorcycle frame 24. In this manner, the wheel 14 along with the present invention 10 can rotate about the axle 54 in either direction of rotation. The device 10 further is operatively connected to a motor 12 (or other power generator) whereby when the motor 12 operates, the operative connection (such as a belt or chain 52) between the motor 12 and the present invention 10 causes the present invention 10, and thus the wheel and tire combination 14, to rotate about the axle 54. When the invention 10 is in the forward drive configuration, the driven wheel and tire configuration 14 will rotate in one direction (for example, forward) and when the invention 10 is in the reverse drive configuration, the driven wheel and tire combination 14 will rotate in the opposite direction (for example, reverse or backward).

An exemplary embodiment of the present invention 10 replaces the rear drive sprocket of a motor cycle so as to retrofit or originally fit a motorcycle with a reverse drive. The motorcycle engine (or other motor 12) drive a drive belt or chain 52 in a conventional manner, namely, only in a single direction with the top run of the belt or chain 52 moving in a direction from the back of the motorcycle to the front of the motor cycle and the bottom run of the belt or chain 52 moving in a direction from the front of the motorcycle to the back of the motorcycle, so as to drive the ring gear 16 and outer casing 26 of the present invention 10 in single rotational manner. In the forward drive configuration, wherein the ring gear 16 and the sun gear 18 are locked relative to each other and the planetary gear carrier 22 and the swing arm 28 are unlocked relative to each other, the sun gear 18 rotates in the same direction as the ring gear 16, the rear wheel and tire combination 14 of the motorcycle is driven in a direction causing the forward motion of the motorcycle. In the reverse drive configuration, wherein the ring gear 16 and the sun gear 18 are unlocked relative to each other and the planetary gear carrier 22 and the swing arm 28 are locked relative to each other, the sun gear 18 rotates in an opposite rotational direction from the ring gear 16, and the rear wheel and tire combination 14 of the motorcycle is driven in a direction causing the rearward motion of the motorcycle.

As the ring gear 16 is operatively connected to the motor 12, as the motor 12 turns for driving the motorcycle, the ring gear 16 is rotated as well, in a manner similar to the driving of a convention al drive sprocket on a conventional motorcycle. More specifically, the motor 12 only turns in one direction and as the motorcycle transmission only comprises forward gears, the motor 12 can only drive the drive belt or chain 52 in a single direction, and therefore, the ring gear 16 also can only turn in one direction.

In use, the present invention 10 is attached to the drive wheel 14 (or other drive component) via the sun gear 18. For driving the vehicle (the motorcycle) in the forward direction, the first locking means 38 and the second locking means 40, which are operatively connected to each other, have the sun gear 18 and the ring gear 16 locked relative to each other and the planet gear carrier 22 and the swing arm 28 unlocked relative to each other.

In the forward driving configuration, the first locking means 38 is positioned such that the prong ring 136 is in a position proximal to or against the inner annular hub 84 portion of the sun gear 18 such that the prongs 118 extend through and out of the tunnels 116 through the inner annular hub 84 portion of the sun gear 18 whereby the prongs 118 engage with the locking base 132 in a locking manner. As the locking base 132 is rigidly attached to the first casing disc 26A of the outer casing 26, the sun gear 18 is prevented from rotating relative to the outer casing 26. Likewise, as the ring gear 16 also is rigidly attached to the first casing disc 26A of the outer casing 26, the sun gear 18 also is prevented from rotating relative to the ring gear 16. Thus, the outer casing 26, the sun gear 18, and the ring gear 16 rotate with each other in the same rotational direction, namely the forward direction.

In the forward driving configuration, the second locking means 40 is positioned such that the first claw ring 168 and the second claw ring 170 are disengaged from each other, namely, the first circular claw face 174 of the first claw ring 168 is disengaged from the second circular claw face 176 of the second claw ring 170. As the first claw ring 168 and the second claw ring 170 are disengaged from each other, nothing prevents the planet gear carrier 22 from rotating, and therefore the planet gear carrier 22 rotates along with the outer casing 26, the ring gear 16, and the sun gear 18. Thus, the outer casing 26, the sun gear 18, the ring gear 16, and the planet gear carrier 22 rotate with each other in the same rotational direction, namely the forward direction. The radial tongue 188 portion of the second claw ring 170 is rotationally attached to the prong ring 136 via the bronze bearing ring 148 and the annular groove 166 formed between the bronze bearing ring 148 and the prong ring 136. This is important in that, as the second claw ring 170 is not rotatable, the rotation of the sun gear 18 and the prong ring 136 will not cause the rotation of the second claw ring 170.

In the forward drive configuration, the motor 12 drives the drive belt 52, which is operationally attached to the device 10 via the outer surface 42 of the ring gear 16 (the drive sprocket equivalent) whereby the motor 12 causes the ring gear 16 to rotate in the forward drive direction. This causes the outer casing 26 and the sun gear 18 also to rotate in the forward drive direction. As the sun gear 18 is rigidly attached to the wheel 14, this causes the wheel 14 also to rotate in the forward drive direction, propelling the vehicle (motorcycle) in the forward direction.

To shift the device 10 from the forward drive configuration to the reverse drive configuration, the actuating means 134 is actuated to move the locking means 38, 40 in a first direction. Whether using a powered or manual actuating means 134, and whether using a squirm gear 1998 based or a bearing base structure 210 for moving the locking means 38, 40, actuating the actuating means 134 causes the axial motion of the first locking means 38 and the second locking means 40 linearly along the axle 54. For driving the vehicle (the motorcycle) in the reverse direction, the first locking means 38 and the second locking means 40, which are operatively connected to each other, are in a position wherein the sun gear 18 and the ring gear 16 are unlocked relative to each other and the planet gear carrier 22 and the swing arm 28 are locked relative to each other.

In moving from the forward driving configuration to the reverse driving configuration, the second locking means 40 is moved by the actuating means 134 whereby the second locking means 40 is positioned such that the first claw ring 168 and the second claw ring 170 are engaged, namely, the first circular claw face 174 of the first claw ring 168 is engaged with the second circular claw face 176 of the second claw ring 170 in a locking manner. As the first claw ring 168 and the second claw ring 170 are engaged with each other in a locking manner, the planet gear carrier 22 is prevented from rotating, and therefore the planet gear carrier 22 does not rotate along with the outer casing 26, the ring gear 16, and the sun gear 18 when the outer casing 26 and ring gear 16 are rotated by the action of the motor 12 and drive belt 52. Specifically, the second claw ring 170 is moved in the direction towards the first claw ring 168, the first claw ring 168 being rigidly attached to the planet gear carrier 22. The second circular claw face 176 of the second claw ring 170 engages the first circular claw face 174 of the first claw ring 168, and as the second claw ring 170 is structurally unable to rotate, this engagement prevents the first claw ring 168 from rotating. In the reverse driving configuration, as the first claw ring 168 is rigidly attached to the planet gear carrier 22, this engagement also prevents the planet gear carrier 22 from rotating.

In moving from the forward driving configuration to the reverse driving configuration, as the second locking means 40 is attached to the first locking means 38, a movement of the second locking means 40 by the actuating means 134 also causes the movement of the first locking means 38. The radial tongue 188 portion of the second claw ring 170 is rotationally attached to the prong ring 136 via the bronze bearing ring 148 and the annular groove 166 formed between the bronze bearing ring 148 and the prong ring 136. Thus, when the second claw ring 170 is moved by the actuating means 134 axially towards the first claw ring 168, the second claw ring 170 pulls the prong ring 136 in the same axial direction whereby the prong ring 136 is pulled away from the inner annular hub 84 portion of the sun gear 18.

In moving from the forward driving configuration to the reverse driving configuration, as the prong ring 136 is being pulled away from the position proximal to or against the inner annular hub 84 portion of the sun gear 18, the prongs 118 are pulled into and through the tunnels 116 through the inner annular hub 84 portion of the sun gear 18 whereby the prongs 118 disengage from the locking base 132 in an unlocking manner. Thus, the sun gear 18 is no longer locked to the locking base 132 and the sun gear 18 is not prevented from rotating relative to the outer casing 26 or to the ring gear 16. The prongs 118 remain in the tunnels 116 through the inner annular hub 84 portion of the sun gear 18, and the or a continued rotation of the sun gear 18 will cause the or a continued rotation of the prong ring 136. However, as the prong ring 136 is rotationally attached to the second claw ring 170, the or a continued rotation of the sun gear 18 and the prong ring 136 will not cause the rotation of the second claw ring 170, which is important as the second claw ring 170 is not rotatable. Thus, manufacturing the tongue 188 of bronze or another low friction material is useful.

In the reverse drive configuration, the motor 12 drives the drive belt 52, which is operationally attached to the device 10 via the outer surface 42 of the ring gear 16 (the drive sprocket equivalent) whereby the motor 12 causes the ring gear 16 to rotate in the forward drive direction. As the planet gear carrier 22 is now prevented from rotating, the rotation of the ring gear 16 will cause the planet gears 20 to rotate in the same direction of rotation as the ring gear 16. The rotation of the planet gears 20 in this direction will cause the sun gear 18 to rotate in a direction of rotation opposite to the direction of rotation of the ring gear 16, which is now possible as the sun gear 18 is not locked to the outer casing 26 or to the ring gear 16. The opposite rotational direction of the sun gear 18 is a rotation in the reverse (rearward) drive direction. As the sun gear 18 is rigidly attached to the wheel 14, this causes the wheel 14 also to rotate in the reverse (rearward) drive direction, propelling the vehicle (motorcycle) in the backward direction.

To be more complete, a description of shifting the device 10 from the reverse drive configuration to the forward drive configuration will be given. To shift the device 10 from the reverse drive configuration to the forward drive configuration, the actuating means 134 is actuated to move the locking means 38, 40 in a second direction opposite the first direction disclosed herein in connection with shifting the device 10 from the forward drive configuration to the reverse drive configuration.

In moving from the reverse driving configuration to the forward driving configuration, the second locking means 40 is moved by the actuating means 134 whereby the second locking means 40 is positioned such that the first claw ring 168 and the second claw ring 170 are disengaged from each other. Specifically, the second claw ring 170 is moved in the direction away from the first claw ring 168, the first claw ring 168 being rigidly attached to the planet gear carrier 22. The second circular claw face 176 of the second claw ring 170 disengages from the first circular claw face 174 of the first claw ring 168, thereby allowing the first claw ring 168 and the planet gear carrier 22 to rotate along with the ring gear 16. In this manner, the ring gear 16 does not cause the rotation of the planet gears 20, and the planet gears 20 do not affect the sun gear 18 or cause the reverse rotation of the sun gear 18.

In moving from the reverse driving configuration to the forward driving configuration, as the second locking means 40 is attached to the first locking means 38, a movement of the second locking means 40 by the actuating means 134 also causes the movement of the first locking means 38. The radial tongue 188 portion of the second claw ring 170 is rotationally attached to the prong ring 136 via the bronze bearing ring 148 and the annular groove 166 formed between the bronze bearing ring 148 and the prong ring 136. Thus, when the second claw ring 170 is moved by the actuating means 134 axially away from the first claw ring 168, the second claw ring 170 pushes the prong ring 136 in the same axial direction whereby the prong ring 136 is pushed towards the inner annular hub 84 portion of the sun gear 18.

In moving from the reverse driving configuration to the forward driving configuration, as the prong ring 136 is being pushed towards the position proximal to or against the inner annular hub 84 portion of the sun gear 18, the prongs 118 are pushed into and through the tunnels 116 through the inner annular hub 84 portion of the sun gear 18 whereby the prongs 118 extend out of the tunnels 116 and engage with the locking base 132 in a locking manner. Thus, the sun gear 18 is locked to the locking base 132 and the sun gear 18 is prevented from rotating relative to the outer casing 26 and to the ring gear 16, and the device 10 is now in the forward drive configuration. As the prong ring 136 is rotationally attached to the second claw ring 170, the or a continued rotation of the sun gear 18 and the prong ring 136 will not cause the rotation of the second claw ring 170, which is important as the second claw ring 170 is not rotatable.

In various embodiments, a plurality of planet gears 20 is used, which may number from 2 to 20, or preferably from 3 to 12. Only one ring gear 16 and one sun gear 18 is required.
No Lubricant is Necessary In certain embodiments, the metadrive 10 comprises no metal rotor to metal rotor contact in operation, uses non-metal bearings 70, 74, and/or uses bronze bearings 148, 188. Thus, the metadrive 10 requires no oil or other liquid, gel, or greasy lubricant, and therefore no lubrication sump and/or a pump to coat the moving parts with oil is required. Rather than using oil-based, natural, or synthetic lubricants, such as liquids, gels, or greases, the present invention 10 can use ball bearings 74 and/or rod bearings 70 between the rotating parts of the invention. For example, synthetic polymers such as acetyl resins possess sufficient tensile strength, creep resistance, and toughness to serve as bearings 70, 74. The DELRIN® brand of polymethylene is a suitable acetyl resin. This acetyl resin can be formed into balls 70 and rods 74 for placement in holes and slots 68, 70, 76, 110, 112 provided in the various moving parts of the invention 10 for imparting bearing surfaces between the rotating parts. Other materials also can be used, including bearings of other plastics.

The metadrive 10 may be cooled and/or cleaned and/or serviced using aqueous solutions. For example, the metadrive 10 outer casing 26 may comprise an entry port that allows sand, dirt, or debris to be flushed out of the gear compartment, with little rust or corrosion occurring to the planetary gear drive system parts and components. The outer casing 26 may comprise entry and exit ports, which entry and exit ports may comprise a water-cooling system operationally linked to the metadrive 10.

The inventive structure of the metadrive 10 may save up to 40%, or up to 25% or more, of the space normally needed for a conventional transmission or reverse drive, with a commensurate weight reduction when compared to a conventional transmission or reverse drive. The use of non-metal ball 74 and rod bearings 70, composite outer casing 26, and the lack of a need for additional lubrication helps reduce the size and weight of the device 10.
Planet Gears can be Non-Metal As illustrated in FIG. 18, the ring gear 16 and the sun gear 18 preferably are made of metal or another material sufficiently strong and durable so as to handle the power output of the motor 12 and to transfer the power output of the motor 12 to the rear wheel 14. The planet gears 20 can be made of metal or the same material as the ring gear 16 and/or sun gear 18, but as shown in FIG. 18A preferably are made of a resilient polymer composition, such as a urethane or rubber, so as to allow mechanical slippage or shape distortion upon over-torqueing of the planetary gear system. For example, if all of the gears of the planetary gear system were made of metal or another rigid material as shown in FIG. 18B representing the prior art, over-torqueing of the system could result in a failure of the system by breakage or jamming. Similarly, as the system is not a closed (sealed) system, foreign objects such as dirt or rocks may be able to enter the system and lodge between the gears of the planetary gear system. By using a resilient polymer composition, such as a urethane or rubber, for the planet gears 20, the planet gears 20 are less likely to bind or jam upon over-torqueing or encountering a foreign object, and will slip, yield, or distort allowing the system to continue to operate. As there are a plurality of planet gears 20, and as the planet gears 20 are smaller relative to the ring gear 16 and the sun gear 18, the use of a resilient polymer composition, such as a urethane or rubber, for the planet gear 20 does not degrade the strength of the system, at least not to an extent that would cause premature failure of the system.

The resilient plastic composition of the planet gears 20 preferably is isotropic. The resilient plastic composition may have an elastic modulus, a Young's modulus, from 200 pounds per square inch (psi) to 1000 psi, preferably from 200 psi to about 700 psi. Planet gears 20 of different polymer compositions can be intermixed in a single device 10. For example, half of the planet gears 20 can be of a harder material and half of the planet gears 20 can be made of a softer material. The elastic modulus imparts a working flexibility to the planet gears 20, for example, urethane and/or rubber planet gears 20, to grip the surfaces of the other metadrive 10 components, that is, the sun gear 18 and the ring gear 16. The grip combines mechanical and friction forces by stretching the drive surface (teeth 32) of the planet gears 20 so that they act to grip both sides, that is, the sun gear 18 and the ring gear 16, of the drive-driven components. Concomitantly, the hardness of the resilient plastics composition imparts durability to the planet gears 20 and allows sufficient power transfer between components. In an embodiment, in any metadrive 10, the resilient plastics composition may be selected according to Young's modulus, and/or a Tensile modulus, and/or Durometer A reading and/or Durometer D reading, according to the chosen use or application of the metadrive 10.

Additionally, plastic planet gears 20 provide for a more forgiving environment. For example, using all metal gears would require there to be exact sizing of and spacing between the planet gears 20 and the ring gear 16 and the sun gear 18 as metal gears have no flexibility. Without such exact sizing or spacing, the gears may not interact properly together. However, plastic planet gears 20 of a suitable material have some flexibility and will still operate even with slight differences in sizing and spacing.

The resilient plastic composition may have a Durometer hardness, or hardness, of from 50 to 95, preferably from about 70 to about 95. Because of the resilience of rubbers and plastics, the hardness reading my change over time, so the indentation time is sometimes reported along with the hardness number. The ASTM test number is ASTM D2240 while the analogous ISO test method is ISO 868.

The metadrive 10, notwithstanding the mode, may be used without a clutch. In other words, there may be no need to use a clutch to gradually raise the power input to the ring gear 16. The resilient plastic planet gears 20 may serve to mechanically slip if the load on the ring gear 16 or the sun gear 18 is too great. In this way, the metadrive 10 acts to minimize backlash, for example, a high shock load, and without breaking the metadrive 10 components. In this way, the metadrive 10 will not self-destruct if exposed to sudden stops such as when the metadrive 10 is positioned between a ship propeller 222 and a motor 12 and the propeller 222 hits a rock. The plastic planet gears 20 will allow slippage past the drive-driven ring gear 16 or sun gear 18 without breakage. The elastic surface of the planet gears 20 will compress and pass under the opposite gear teeth or surfaces 34, 36 and decompress on the other side of the other gear teeth or surfaces 34, 36. If such planet gears 20 were steel or substantially non-resilient plastic planet gears 20, the planet gears 20 would strip or shatter unless another safety mechanism, for example a shear pin or a limiting, was broken or engaged, respectively.

In preferred embodiments of the invention, the resilient plastics composition may be selected according to a coefficient of static friction and/or a coefficient of kinetic friction. Such coefficients are known to a person of ordinary skill in the art. A preferred coefficient of static friction for the invention may be from about 0.1 to about 0.7.

Representative resilient plastic compositions for the planet gears 20 may comprise one or more of a urethane, a polyurethane, a polyester, a nylon, a silicone, a rubber, a nylon, and an acetyl copolymer. The resilient plastic compositions may have a low to moderate water absorption profile, for example, it may absorb from 0.1 to 1% of water per unit weight of the composition. The resilient plastic compositions may have low thermal expansion, for example, the composition may expand less than 10% to 25%, or less than 5% to 10%, between room temperature and 40° C.

In some embodiments, the planet gears 20 may comprise shaped teeth 32 surfaces to increase the grip of the planet gear teeth 32 against the ring gear teeth 34 and/or the sun gear teeth 36.

Use as an Overdrive, an Underdrive, a Reduction Drive, and a Reverse Drive

As illustrated in FIG. 19, the present invention 10 is not limited to use as a motorcycle reverse drive. For example, the present invention 10 can be used as an overdrive, an underdrive, a reduction drive, and a reverse drive in a myriad of applications, including for driving a propeller on a boat or ship. The ring gear 16, the planet gears 20, and the sun gear 18 can be sized to as to provide for an underdrive by powering the ring gear 16 and attaching the sun gear 18 to the drive component 14. Similarly, the ring gear 16, the planet gears 20, and the sun gear 18 can be sized to as to provide for an overdrive by powering the sun gear 18 and attaching the ring gear 16 to the drive component 14. In any of the uses of the metadrive 10, the locking means 38, 40 can be incorporated to cooperate with a support structure to allow the metadrive 10 to provide for reverse drive and reverse propulsion.

Preferably, the metadrive 10, when used as any type of drive, comprises planet gears 20 manufactured from a resilient plastic material so as to allow mechanical slippage or shape distortion upon over-torqueing of the metadrive 10. As discussed herein, use of planet gears 20 manufactured from a resilient plastic imparts a working flexibility to the planet gears 20 to grip the surfaces of the other metadrive 10 components, that is, the sun gear 18 and the ring gear 16. The grip combines mechanical and friction forces by stretching the drive surface 32 of the planet gears 20 so that they act to grip both sides, that is, the sun gear 18 and the ring gear 16, of the drive-driven components. Concomitantly, the hardness of the resilient plastics composition imparts durability to the metadrive 10 planet gears 20 and allows sufficient power transfer between components. Additionally, plastic planet gears 20 provide for a more forgiving environment. Using all metal gears would require there to be exact sizing of and spacing between the planet gears 20 and the ring gear 16 and the sun gear 18 as metal gears have no flexibility. Without such exact sizing or spacing, the gears may not interact properly together. However, plastic planet gears 20 of a suitable material have some flexibility and will still operate even with slight differences in sizing and spacing.

Systems, devices and methods for the present metadrive 10 have been described using detailed descriptions of embodiments thereof that are provided by way of example and are not intended to limit the scope of the disclosure. The described embodiments comprise different features, not all of which are required in all embodiments of a metadrive 10. Some embodiments of a metadrive 10 utilize only some of the features or possible combinations of the features. Variations of embodiments of a metadrive 10 that are described and embodiments of a metadrive 10 comprising different combinations of features noted in the described embodiments will occur to persons of the art.

Therefore, although selected aspects have been illustrated and described in detail, it will be understood that various substitutions and alterations may be made therein without departing from the spirit and scope of the present invention, as defined by the following claims.

LIST OF REFERENCE NUMERALS

10 Invention, device, metadrive, planetary gear drive system
12 motor 14 wheel, wheel and tire combination
16 ring gear
16A inner ring
16B outer ring
18 sun gear
20 planet gear
22 planet gear carrier
24 frame, motorcycle frame
26 outer casing
26A first casing disc
26B second casing disc
28 swing arm
30 casing axial opening
30A first casing axial opening
30B second casing axial opening
32 planet gear teeth, bumps, or ridges
34 ring gear inner teeth, bumps, or ridges
36 sun gear teeth
38 first locking means
40 second locking means
42 ring gear outer surface
44 ring gear inner surface
46 ring gear wall thickness
48 ring gear height
50 ring gear outer teeth, bumps, or ridges
52 drive belt or chain
54 axle
56 ring gear holes
58 planet gear carrier outer surface
60 planet gear carrier inner surface
62 planet gear carrier first face
64 planet gear carrier second face
66 pinion
68 first rod bearing holder
70 rod bearing
72 first ball bearing holder
74 ball bearing
76 second rod bearing holder
78 roller bearing
80 planet gear carrier passage or port
82 sun gear outer annular ring
84 sun gear inner annular hub
86 sun gear outer surface
88 sun gear inner surface
90 sun gear first face
92 sun gear second face
94 sun gear thickness
96 sun gear height
98 hub inner surface
100 hub first face
102 hub second face
104 hub thickness
106 hub height
108 sun gear teeth, bumps, or ridges
110 second ball bearing holder
112 third ball bearing holder
114 access port or slot
116 tunnel
118 prong
120 prong support
122 open side of port or slot
124 prong holder
126 mounting hole
128 hub axial hole or passage
130 axle guide sleeve
132 locking base
134 actuating means
134A actuating means activating switch
136 prong ring
138 locking base circular face
140 locking base detent
142 inner locking claw
144 ramp or slope
146 hole
148 bearing ring
148A flat bearing ring
148B spacer ring
150 bearing ring outer circumferential surface
152 bearing ring inner circumferential surface
154 bearing ring front face
156 bearing ring rear face
158 bearing ring step tread
160 bearing ring step riser or middle circumferential surface
162 bearing ring hole
164 attachment hole
166 annular groove
168 first claw ring
170 second claw ring
172 mounting yoke
174 first circular claw face
176 second circular claw face
178 second claw ring cylindrical wall
180 second claw ring outer surface
182 second claw ring inner surface
184 second claw ring hollow interior
186 second claw ring open end
186A second claw ring first open end
186B second claw ring second open end
188 circular or radial tongue
188A separate circular or radial tongue
190 claw face detent
192 claw face slope
192A claw face first slope
192B claw face second slope
194 claw face wall
196 axle bearing, sleeve
198 squirm, screw, or worm gear
200 squirm gear cylindrical wall
202 squirm gear outer surface
204 squirm gear inner surface
206 squirm gear hollow interior
208 squirm gear open end
208A squirm gear first open end
208B squirm gear second open end
210 squirm gear bearing
212 squirm gear screw thread
214 second claw ring cooperative screw thread
216 actuating means solenoid or motor
218 actuating means mechanical connection
220 actuating lever, rod, or structure
222 propeller
224 decorative faceplate
226 connecting pins
228 axle bolt, nut
230 attachment plate
232 bearing, retainer

What is claimed is:
1. A drive system, comprising:
a) a planetary gear system comprising a plurality of planet gears rotatably mounted on a planet gear carrier, a sun gear, and a ring gear; and b) a locking means for locking and unlocking the sun gear relative to the ring gear and for allowing and preventing the planet gear carrier from rotating, the locking means comprising
  i) a first locking means for locking the sun gear relative to the ring gear, the first locking means being movable from a first position for locking the sun gear relative to the ring gear to a second position for unlocking the sun gear relative to the ring gear, wherein the first locking means comprises a prong and a locking base, wherein the prong is operationally connected to the sun gear and cooperates with the locking base to lock and unlock the sun gear relative to the ring gear; and
  ii) a second locking means for preventing the planet gear carrier from rotating, the second locking means being movable from a first position for allowing the planet gear carrier to rotate to a second position for preventing the planet gear carrier from rotating, wherein the second locking means comprises cooperating first and second claw faces, wherein the first claw face is operationally connected to the planet gear carrier and cooperates with the second claw face to allow and prevent the planet gear carrier from rotating,
wherein the locking means is movable from
  a first position for locking the sun gear relative to the ring gear and for allowing the planet gear carrier to rotate
  to a second position for unlocking the sun gear relative to the ring gear and for preventing the planet gear carrier from rotating,
wherein when the locking means is in the first position, the sun gear rotates in the same rotational direction as the ring gear providing a first drive direction,
wherein when the locking means is in the second position, the sun gear rotates in the opposite rotational direction as the ring gear providing a second drive direction opposite to the first drive direction, and
wherein the plurality of planet gears are made from a material that allows mechanical slippage or shape distortion of the planet gears relative to the any of the sun gear and the ring gear upon over-torqueing of the planetary gear system.

2. The drive system of claim 1, further comprising an actuating means for moving the locking means from the first position to the second position and from the second position to the first position.

3. The drive system of claim 2, wherein the actuating means comprises a squirm gear that, when rotated, moves the locking means in an axial direction.

4. The drive system of claim 1, wherein the material of the planet gear is a resilient plastic material.

5. The drive system of claim 4, wherein the resilient plastic material comprises a tensile modulus from 50 to 2000 psi at 300% extension.

6. The drive system of claim 4, wherein the resilient plastic material comprises a urethane.

7. The drive system of claim 4, wherein the resilient plastic material has a Durometer A value of 70 to 95.

8. The drive system of claim 4, wherein the resilient plastic material has a coefficient of static friction of from 0.1 to 0.7.

9. The drive system of claim 1, further comprising acetyl resin bearings located between the sun gear and the planet gear carrier.

10. The drive system of claim 1, further comprising an outer casing for containing the ring gear, the planet gear carrier, the plurality of planet gears, and the sun gear, whereby a hub portion of the sun gear is accessible through the outer casing, and whereby a drive component is attachable to the hub portion of the sun gear.

11. The drive system of claim 10, use as a drive system for a motorcycle.

12. A drive system comprising a planetary gear system comprising:
  a) a plurality of planet gears rotatably mounted on a planet gear carrier, a sun gear, and a ring gear, wherein the plurality of planet gears are made from a material that allows mechanical slippage or shape distortion of the planet gears relative to the any of the sun gear and the ring gear upon over-torqueing of the planetary gear system; and
  b) a locking means for locking and unlocking the sun gear relative to the ring gear and for allowing and preventing the planet gear carrier from rotating, the locking means comprising
    i) a first locking means for locking the sun gear relative to the ring gear, the first locking means being movable from a first position for locking the sun gear relative to the ring gear to a second position for unlocking the sun gear relative to the ring gear, wherein the first locking means cooperates with the locking base to lock and unlock the sun gear relative to the ring gear; and
    ii) a second locking means for preventing the planet gear carrier from rotating, the second locking means being movable from a first position for allowing the planet gear carrier to rotate to a second position for preventing the planet gear carrier from rotating, wherein the second locking means comprises cooperating first and second faces, wherein the first face is operationally connected to the planet gear carrier and cooperates with the second face to allow and prevent the planet gear carrier from rotating.

13. The drive system of claim 12, wherein the material of the planet gear is a resilient plastic material.

14. The drive system of claim 13, wherein the resilient plastic material comprises a tensile modulus from 50 to 2000 psi at 300% extension.

15. The drive system of claim 13, wherein the resilient plastic material comprises a urethane.

16. The drive system of claim 13, wherein the resilient plastic material has a Durometer A value of 70 to 95.

17. The drive system of claim 13, wherein the resilient plastic material has a coefficient of static friction of from 0.1 to 0.7.

* * * * *